United States Patent
Callaway, Jr. et al.

(10) Patent No.: US 9,461,688 B2
(45) Date of Patent: *Oct. 4, 2016

(54) POWER EFFICIENT COMMUNICATIONS

(75) Inventors: Edgar H. Callaway, Jr., Boca Raton, FL (US); Paul E. Gorday, West Palm Beach, FL (US)

(73) Assignee: SUNRISE MICRO DEVICES, INC., Deerfield Beach, FL (US)

( * ) Notice: Subject to any disclaimer, the term of this patent is extended or adjusted under 35 U.S.C. 154(b) by 305 days.

This patent is subject to a terminal disclaimer.

(21) Appl. No.: 13/045,950

(22) Filed: Mar. 11, 2011

(65) Prior Publication Data

US 2011/0222419 A1 Sep. 15, 2011

Related U.S. Application Data

(60) Provisional application No. 61/313,319, filed on Mar. 12, 2010.

(51) Int. Cl.
*H04B 14/06* (2006.01)
*H04B 1/3883* (2015.01)
*H04W 52/02* (2009.01)
*G05F 1/66* (2006.01)

(52) U.S. Cl.
CPC ............... *H04B 1/3883* (2013.01); *G05F 1/66* (2013.01); *H04W 52/0261* (2013.01); *Y02B 60/50* (2013.01)

(58) Field of Classification Search
CPC . H04L 27/00; H04L 25/4902; H04L 1/0009; H04L 1/0041; H04L 25/49; H04L 1/0003; H04L 1/0071; H04L 5/0007; H04L 27/0008; H04B 3/54
USPC .......................... 375/259, 260, 295, 316, 219
See application file for complete search history.

(56) References Cited

U.S. PATENT DOCUMENTS

| | | |
|---|---|---|
| 4,410,764 A | 10/1983 | Werth et al. |
| 4,465,970 A | 8/1984 | DiMassimo et al. |
| 5,302,914 A | 4/1994 | Arntz et al. |
| 5,627,857 A | 5/1997 | Wilson |
| 5,991,262 A | 11/1999 | Laird et al. |
| 6,411,608 B2 | 6/2002 | Sharony |
| 6,415,161 B1 | 7/2002 | Fujita |
| 6,621,367 B2 | 9/2003 | Suzuki et al. |
| 6,697,375 B1 | 2/2004 | Meng |
| 6,707,862 B1 | 3/2004 | Larsson |
| 6,710,578 B1 | 3/2004 | Sklovsky |
| 6,741,661 B2 | 5/2004 | Wheatley et al. |

(Continued)

FOREIGN PATENT DOCUMENTS

EP 1617614 1/2006

OTHER PUBLICATIONS

PCT Search Report, PCT Appl. PCT/US2011/028059, Korean Intellectual Peropty Office, Oct. 25, 2011.

(Continued)

*Primary Examiner* — Zewdu Kassa
(74) *Attorney, Agent, or Firm* — Leveque Intellectual Property Law, P.C.

(57) ABSTRACT

A method, system, and device provide power-efficient communications within the context of available power. Transmission and receipt data rates are scalable in accordance with output power available from a power source. Data is transmitted at a data rate determined, at least in part, by the available output power.

31 Claims, 8 Drawing Sheets

(56) References Cited

U.S. PATENT DOCUMENTS

| | | |
|---|---|---|
| 6,745,044 B1 | 6/2004 | Holtzman et al. |
| 6,876,875 B2 | 4/2005 | Shimazaki et al. |
| 6,882,128 B1 | 4/2005 | Rahmel et al. |
| 6,882,847 B2 | 4/2005 | Craig et al. |
| 6,925,128 B2 | 8/2005 | Corral |
| 6,944,469 B2 | 9/2005 | Jo et al. |
| 6,985,433 B1 | 1/2006 | Laroia et al. |
| 7,020,469 B2 | 3/2006 | Choi et al. |
| 7,050,819 B2 | 5/2006 | Schwengler |
| 7,054,385 B2 | 5/2006 | Booth et al. |
| 7,062,250 B1 | 6/2006 | Kosaka |
| 7,081,693 B2 | 7/2006 | Hamel et al. |
| 7,105,982 B1 | 9/2006 | Hagood et al. |
| 7,139,237 B2 | 11/2006 | Nangia |
| 7,224,642 B1 | 5/2007 | Tran |
| 7,256,505 B2 | 8/2007 | Arms et al. |
| 7,313,195 B2 | 12/2007 | Chen et al. |
| 7,313,373 B1 | 12/2007 | Laskharian |
| 7,319,723 B2 | 1/2008 | Jung et al. |
| 7,324,824 B2 | 1/2008 | Smith et al. |
| 7,361,998 B2 | 4/2008 | Hamel et al. |
| 7,365,455 B2 | 4/2008 | Hamel et al. |
| 7,366,483 B2 | 4/2008 | Liu |
| 7,395,039 B2 | 7/2008 | Akizuki et al. |
| 7,409,009 B2 | 8/2008 | Akhtman |
| 7,429,805 B2 | 9/2008 | Hamel et al. |
| 7,444,167 B2 | 10/2008 | Chang |
| 7,451,365 B2 | 11/2008 | Wang et al. |
| 7,505,479 B2 | 3/2009 | Meng |
| 7,512,097 B2 | 3/2009 | Jelitto et al. |
| 7,528,698 B2 | 5/2009 | Mickle |
| 7,539,466 B2 | 5/2009 | Tan et al. |
| 7,548,767 B2 | 6/2009 | Kim et al. |
| 7,570,929 B1 | 8/2009 | Trompower |
| 7,634,022 B2 | 12/2009 | Morimoto et al. |
| 7,639,650 B2 | 12/2009 | Cho et al. |
| 7,639,747 B2 | 12/2009 | Moffatt et al. |
| 7,689,239 B2 | 3/2010 | Reed et al. |
| 7,692,411 B2 | 4/2010 | Trainor et al. |
| 7,694,160 B2 | 4/2010 | Esliger et al. |
| 7,701,839 B2 | 4/2010 | Nangia |
| 7,729,433 B2 | 6/2010 | Jalloul |
| 7,735,113 B2 | 6/2010 | Koga |
| 7,787,513 B2 | 8/2010 | Siwiak et al. |
| 7,792,505 B2 | 9/2010 | Mueller |
| 7,797,013 B2 | 9/2010 | Skarby et al. |
| 7,808,940 B2 | 10/2010 | Huo et al. |
| 7,822,136 B2 | 10/2010 | Moffatt et al. |
| 7,852,743 B2 | 12/2010 | Kwon |
| 7,853,250 B2 | 12/2010 | Harvey et al. |
| 7,853,262 B2 | 12/2010 | Cheon et al. |
| 7,884,727 B2 | 2/2011 | Tran |
| 7,884,737 B2 | 2/2011 | Zigdon et al. |
| 7,903,618 B2 | 3/2011 | Cho et al. |
| 7,903,629 B2 | 3/2011 | Walker et al. |
| 7,907,962 B2 | 3/2011 | Shoji |
| 7,908,928 B2 | 3/2011 | Vik et al. |
| 7,924,799 B2 | 4/2011 | Maruhashi et al. |
| 7,933,571 B2 | 4/2011 | Black et al. |
| 7,941,115 B2 | 5/2011 | Aniruddhan et al. |
| 7,952,433 B2 | 5/2011 | An et al. |
| 7,953,459 B2 | 5/2011 | Kim et al. |
| 7,956,572 B2 | 6/2011 | Zane et al. |
| 7,962,182 B2 | 6/2011 | Kwan |
| 7,982,439 B2 | 7/2011 | Trainor et al. |
| 7,986,738 B2 | 7/2011 | Sankabathula et al. |
| 8,000,268 B2 | 8/2011 | Fukuta |
| 8,014,807 B2 | 9/2011 | Matsumoto |
| 8,036,265 B1 | 10/2011 | Reynolds et al. |
| 8,117,467 B2 | 2/2012 | Chang et al. |
| 8,131,324 B2 | 3/2012 | Hossain et al. |
| 8,135,081 B2 | 3/2012 | Moffatt et al. |
| 8,139,550 B2 | 3/2012 | Khan et al. |
| 8,149,969 B2 | 4/2012 | Khan et al. |
| 8,155,712 B2 | 4/2012 | Gilb et al. |
| 8,175,178 B2 | 5/2012 | Moffatt |
| 8,184,609 B2 | 5/2012 | Khan et al. |
| 8,188,703 B2 | 5/2012 | Chen et al. |
| 8,189,697 B2 | 5/2012 | Moffatt et al. |
| 8,195,105 B1 | 6/2012 | Erickson |
| 8,228,194 B2 | 7/2012 | Mickle et al. |
| 8,229,009 B2 | 7/2012 | Moffatt |
| 8,238,507 B2 | 8/2012 | Sheu |
| 8,243,774 B2 | 8/2012 | Khan et al. |
| 8,244,311 B2 | 8/2012 | Boss et al. |
| 8,249,731 B2 | 8/2012 | Tran et al. |
| 8,253,307 B2 | 8/2012 | Wright |
| 8,284,797 B2 | 10/2012 | Mosig |
| 8,330,298 B2 | 12/2012 | Scherbenski et al. |
| 8,331,466 B2 | 12/2012 | Guo |
| 8,340,072 B2 | 12/2012 | Ma |
| 8,344,529 B2 | 1/2013 | Mansfield et al. |
| 8,362,713 B2 | 1/2013 | Recker et al. |
| 8,369,377 B2 | 2/2013 | Michaels et al. |
| 8,369,431 B2 | 2/2013 | Walker et al. |
| 8,384,475 B2 | 2/2013 | Gustavsson et al. |
| 8,391,375 B2 | 3/2013 | Sammel et al. |
| 8,442,590 B2 | 5/2013 | Wang |
| 8,472,535 B2 | 6/2013 | Wallen |
| 8,552,597 B2 | 10/2013 | Song et al. |
| 8,565,170 B2 | 10/2013 | Zhang |
| 8,600,313 B2 | 12/2013 | Ito |
| 8,618,934 B2 | 12/2013 | Belov et al. |
| 8,730,877 B2 | 5/2014 | Palanki |
| 8,792,839 B2 | 7/2014 | Hu |
| 8,838,122 B2 | 9/2014 | Stamoulis |
| 2001/0009555 A1 | 7/2001 | Diepstraten et al. |
| 2002/0030591 A1* | 3/2002 | Paranjpe ................. 340/436 |
| 2002/0118765 A1 | 8/2002 | Nangia |
| 2003/0009772 A1* | 1/2003 | Karr ....................... 725/142 |
| 2004/0085940 A1 | 5/2004 | Black et al. |
| 2004/0086058 A1 | 5/2004 | Eckhardt et al. |
| 2004/0101037 A1 | 5/2004 | Meng |
| 2004/0136315 A1 | 7/2004 | Chang |
| 2004/0174928 A1 | 9/2004 | Siwiak et al. |
| 2004/0204181 A1 | 10/2004 | Cromer et al. |
| 2005/0025220 A1 | 2/2005 | Laroia et al. |
| 2005/0059421 A1 | 3/2005 | Reed et al. |
| 2005/0116545 A1 | 6/2005 | Hamel et al. |
| 2005/0128998 A1 | 6/2005 | Jelitto et al. |
| 2005/0136869 A1 | 6/2005 | Liu |
| 2005/0140212 A1 | 6/2005 | Hamel et al. |
| 2005/0146220 A1 | 7/2005 | Hamel et al. |
| 2005/0186923 A1 | 8/2005 | Chen et al. |
| 2005/0220201 A1 | 10/2005 | Laroia et al. |
| 2005/0286648 A1 | 12/2005 | Feng et al. |
| 2006/0002451 A1 | 1/2006 | Fukuta |
| 2006/0063498 A1* | 3/2006 | Chan ..................... 455/127.2 |
| 2006/0068830 A1 | 3/2006 | Klomsdorf et al. |
| 2006/0111057 A1 | 5/2006 | Akizuki et al. |
| 2006/0128324 A1 | 6/2006 | Tan et al. |
| 2006/0203927 A1* | 9/2006 | Tzannes et al. .......... 375/260 |
| 2006/0217098 A1* | 9/2006 | Anderson et al. ........ 455/255 |
| 2006/0250960 A1 | 11/2006 | Ando |
| 2006/0262714 A1 | 11/2006 | Tarokh et al. |
| 2007/0040947 A1 | 2/2007 | Koga |
| 2007/0049239 A1 | 3/2007 | Joung et al. |
| 2007/0081504 A1 | 4/2007 | Shih et al. |
| 2007/0081604 A1 | 4/2007 | Khan et al. |
| 2007/0082696 A1 | 4/2007 | Wang |
| 2007/0091866 A1 | 4/2007 | Nangia |
| 2007/0123314 A1 | 5/2007 | Ragan |
| 2007/0123946 A1 | 5/2007 | Masoud |
| 2007/0133493 A1 | 6/2007 | Maruhashi et al. |
| 2007/0182362 A1 | 8/2007 | Trainor et al. |
| 2007/0205843 A1 | 9/2007 | Morimoto et al. |
| 2007/0207759 A1* | 9/2007 | Vavelidis et al. ........ 455/232.1 |
| 2007/0211619 A1 | 9/2007 | Jalloul |
| 2007/0253370 A1* | 11/2007 | Khan et al. ............... 370/331 |
| 2007/0254662 A1 | 11/2007 | Khan et al. |
| 2008/0034096 A1 | 2/2008 | Tourzni et al. |
| 2008/0049660 A1* | 2/2008 | Kwan et al. .............. 370/318 |
| 2008/0049708 A1 | 2/2008 | Khan et al. |
| 2008/0059921 A1 | 3/2008 | Esliger et al. |

(56) References Cited

U.S. PATENT DOCUMENTS

| | | |
|---|---|---|
| 2008/0075191 A1 | 3/2008 | Haartsen |
| 2008/0095110 A1 | 4/2008 | Montojo et al. |
| 2008/0118001 A1 | 5/2008 | Chan et al. |
| 2008/0151831 A1 | 6/2008 | Khan et al. |
| 2008/0152054 A1 | 6/2008 | Franck et al. |
| 2008/0159537 A1 | 7/2008 | Khan et al. |
| 2008/0162770 A1 | 7/2008 | Titiano et al. |
| 2008/0182530 A1 | 7/2008 | Mueller et al. |
| 2008/0264144 A1 | 10/2008 | Mao et al. |
| 2008/0301322 A1 | 12/2008 | Horibe |
| 2008/0318535 A1* | 12/2008 | Black et al. ............... 455/127.5 |
| 2009/0023416 A1* | 1/2009 | Haber et al. ............... 455/343.3 |
| 2009/0075689 A1* | 3/2009 | Aniruddhan et al. ..... 455/550.1 |
| 2009/0103639 A1 | 4/2009 | Sankabathula et al. |
| 2009/0125517 A1 | 5/2009 | Krishnaswamy et al. |
| 2009/0125585 A1 | 5/2009 | Krishnaswamy et al. |
| 2009/0152954 A1* | 6/2009 | Le et al. ...................... 307/110 |
| 2009/0167110 A1 | 7/2009 | Berkcan et al. |
| 2009/0175228 A1* | 7/2009 | Kimura et al. ............... 370/329 |
| 2009/0207753 A1 | 8/2009 | Bieganski |
| 2009/0210178 A1 | 8/2009 | Bieganski |
| 2009/0215396 A1 | 8/2009 | Rofougaran et al. |
| 2009/0216847 A1 | 8/2009 | Krishnaswamy et al. |
| 2009/0230924 A1 | 9/2009 | Wright |
| 2009/0252134 A1* | 10/2009 | Schlicht et al. ............. 370/338 |
| 2009/0304097 A1 | 12/2009 | Han et al. |
| 2009/0319267 A1 | 12/2009 | Kurki-Suonio |
| 2009/0325585 A1 | 12/2009 | Farajidana |
| 2010/0026479 A1 | 2/2010 | Tran |
| 2010/0039234 A1 | 2/2010 | Soliven et al. |
| 2010/0067615 A1 | 3/2010 | Dorpinghaus et al. |
| 2010/0068996 A1 | 3/2010 | Haartsen |
| 2010/0080265 A1 | 4/2010 | Moffatt et al. |
| 2010/0080311 A1 | 4/2010 | Moffatt et al. |
| 2010/0080312 A1 | 4/2010 | Moffatt |
| 2010/0084920 A1 | 4/2010 | Banting et al. |
| 2010/0091755 A1* | 4/2010 | Kwon et al. .................. 370/344 |
| 2010/0103919 A1 | 4/2010 | Murakami |
| 2010/0127780 A1 | 5/2010 | An et al. |
| 2010/0135229 A1 | 6/2010 | Lohr et al. |
| 2010/0141153 A1 | 6/2010 | Recker et al. |
| 2010/0153758 A1 | 6/2010 | Esliger et al. |
| 2010/0164711 A1 | 7/2010 | Arms et al. |
| 2010/0195482 A1 | 8/2010 | Walker et al. |
| 2010/0198280 A1 | 8/2010 | Corndorf et al. |
| 2010/0240385 A1 | 9/2010 | Lohr et al. |
| 2010/0257529 A1 | 10/2010 | Wilkerson et al. |
| 2010/0271199 A1 | 10/2010 | Belov et al. |
| 2010/0291975 A1 | 11/2010 | Dimpflmaier et al. |
| 2010/0328047 A1 | 12/2010 | Jantunen et al. |
| 2011/0007491 A1 | 1/2011 | Robinson et al. |
| 2011/0009049 A1 | 1/2011 | Kim et al. |
| 2011/0019719 A1 | 1/2011 | Michaels et al. |
| 2011/0028088 A1 | 2/2011 | Avellan |
| 2011/0038342 A1 | 2/2011 | Lindskog et al. |
| 2011/0053533 A1 | 3/2011 | Chan |
| 2011/0060535 A1 | 3/2011 | Arms et al. |
| 2011/0071970 A1 | 3/2011 | Massie et al. |
| 2011/0105059 A1 | 5/2011 | Gaal |
| 2011/0115622 A1 | 5/2011 | Sadwick |
| 2011/0218014 A1 | 9/2011 | Abu-Qahouq |
| 2011/0218690 A1 | 9/2011 | O'Callaghan et al. |
| 2011/0222419 A1 | 9/2011 | Callaway et al. |
| 2011/0222454 A1 | 9/2011 | Callaway et al. |
| 2011/0222613 A1 | 9/2011 | Callaway et al. |
| 2011/0222614 A1 | 9/2011 | Callaway et al. |
| 2011/0223874 A1 | 9/2011 | Callaway, Jr. |
| 2011/0233932 A1 | 9/2011 | Zawoy et al. |
| 2011/0241625 A1 | 10/2011 | LoCascio |
| 2011/0248846 A1 | 10/2011 | Belov et al. |
| 2011/0254514 A1 | 10/2011 | Fleming |
| 2011/0260556 A1 | 10/2011 | Partridge et al. |
| 2011/0285527 A1 | 11/2011 | Arms et al. |
| 2011/0309618 A1 | 12/2011 | Gieras et al. |
| 2012/0021709 A1 | 1/2012 | Guthrie |
| 2012/0023171 A1 | 1/2012 | Redmond |
| 2012/0062249 A1 | 3/2012 | Shamir |
| 2012/0074843 A1 | 3/2012 | Recker et al. |
| 2012/0080944 A1 | 4/2012 | Recker et al. |
| 2012/0091234 A1 | 4/2012 | Carmein et al. |
| 2012/0092157 A1 | 4/2012 | Tran |
| 2012/0098432 A1 | 4/2012 | Recker et al. |
| 2012/0098439 A1 | 4/2012 | Recker et al. |
| 2012/0106103 A1 | 5/2012 | Nohra |
| 2012/0114074 A1 | 5/2012 | Moffatt et al. |
| 2012/0151240 A1 | 6/2012 | Robinson et al. |
| 2012/0224552 A1 | 9/2012 | Feuersanger et al. |
| 2012/0256492 A1 | 10/2012 | Song et al. |
| 2012/0263162 A1 | 10/2012 | Odenwalder |
| 2012/0299706 A1 | 11/2012 | Koo et al. |
| 2013/0034036 A1 | 2/2013 | Callaway, Jr. |
| 2013/0035043 A1 | 2/2013 | Callaway, Jr. |
| 2013/0058385 A1 | 3/2013 | Callaway, Jr. |
| 2013/0058422 A1 | 3/2013 | Callaway, Jr. |
| 2013/0058423 A1 | 3/2013 | Callaway, Jr. |

OTHER PUBLICATIONS

Luis Peneda, Abílio Azenha, and Adriano Carvalho, "Trilateration for Indoors Positioning Within the Framework of Wireless Communications," *Proceedings, 35th Annual Conference of IEEE Industrial Electronics*, 2009, pp. 2732-2737.

IEC 60489-6, Annex E., Jul. 1, 1999.

Ash, D.L., "Advances in SAW Technology", http://www.rfm.com/products/apnotes/lpra.pdf, first presented at Radio Solutions conference, Birmingham, GB, Oct. 20-21, 1999.

OA mailed on Mar. 26, 2013 U.S. Appl. No. 13/649,816.

OA mailed on Dec. 31, 2014 U.S. Appl. No. 13/649,697.

OA mailed on Jun. 1, 2015 U.S. Appl. No. 13/649,697.

USPTO PTAB, Appeal 2015-006710, Sep. 18, 2015 for related case U.S. Appl. No. 13/045,932.

USPTO, U.S. Appl. No. 13/649,816, Notice of Allowance, Oct. 7, 2015.

USPTO, U.S. Appl. No. 13/045,932, Notice of Allowance, Oct. 9, 2015.

\* cited by examiner

POWER EFFICIENT COMMUNICATIONS

PRIORITY CLAIM

This application claims priority to U.S. Provisional Patent Application No. 61/313,319 filed Mar. 12, 2010, which is hereby incorporated herein by reference.

CROSS REFERENCE TO RELATED APPLICATIONS

This application is related to the following co-pending U.S. patent applications: Application Ser. No. 13/045,882 filed on Mar. 11, 2011; application Ser. No. 13/045,896 filed on Mar. 11, 2011; application Ser. No. 13/045,915 filed on Mar. 11, 2011; application Ser. No. 13/045,932 filed on Mar. 11, 2011, which are incorporated herein in their entirety.

BACKGROUND

Compared to a battery, an energy harvesting (EH) power source, a type of electrical power source, has fundamentally different energy- and power-related behavior. A battery has a finite amount of energy stored in it, but can (in principle) source an arbitrarily high peak power—limited only by the non-idealities of the cell (e.g., its internal resistance). An EH source, on the other hand, can source energy for an indefinitely long time, but has a finite peak power capability. Compared to a load powered by a battery, a load powered by an EH source therefore has fundamentally different requirements placed on it.

A load powered by a battery must be energy-efficient. Since the battery's stored energy is limited, while its peak power sourcing ability is (substantially) not limited, the relevant performance metric of the load is the energy consumed per unit of work performed. A well-designed load therefore operates in burst mode, using a low duty cycle to maximize sleep time and, therefore, minimize the amount of energy consumed per activity performed. Its peak power consumption will be much higher than that of the equivalent EH-sourced design.

A load powered by an EH, conversely, must be power-efficient. Since the peak power sourcing ability of the EH is limited, while the amount of energy it can source is indefinitely large, the relevant performance metric of the load is its peak power consumption. A well-designed load therefore operates in a continuous mode, eschewing sleep modes and, therefore, minimizing its peak power consumption. Its energy consumption will be much higher than that of the equivalent battery-sourced design.

Given the foregoing, it can be appreciated that an optimally-designed load powered, by an EH power source, therefore, behaves quite differently from an optimally-designed load powered by a battery.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
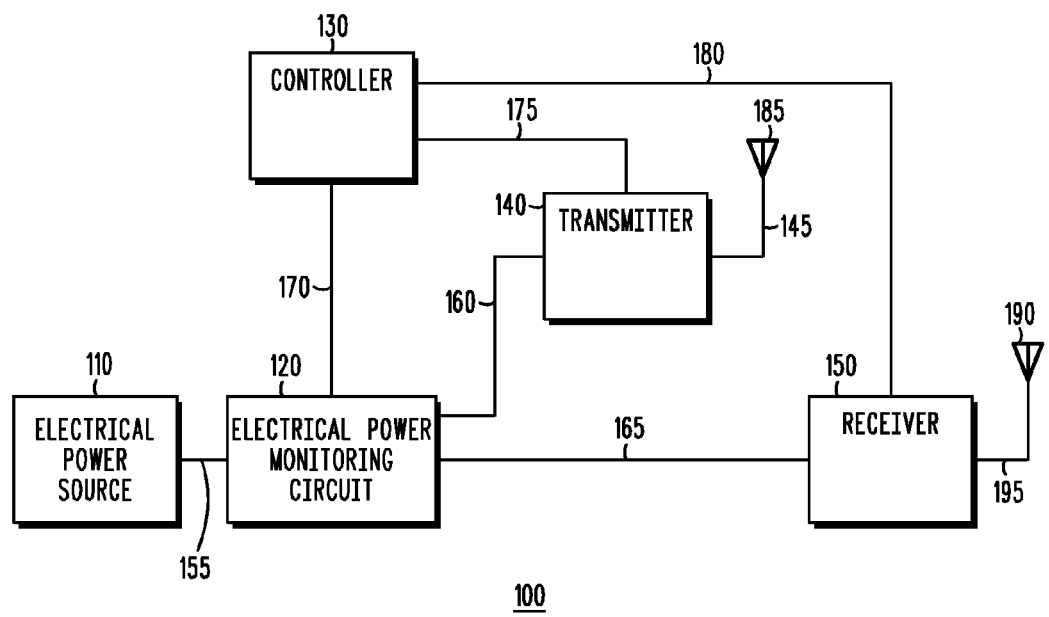
FIG. 1 is a block diagram of a system, in accordance with various representative embodiments.

The various methods, systems, and devices described herein provide power-efficient communications within the context of available power. Transmission and receipt data rates are scalable in accordance with output power available from a power source. Data may be transmitted at a data rate determined, at least in part by the available output power.

In accordance with certain embodiments of the present disclosure, there are provided various methodologies, devices, and systems that employ power-efficient transmit communications comprising: determining an available output power of an electrical power source; and transmitting data at a data rate determined, at least in part, by the available output power. This may further comprise minimizing the ratio of peak to average power consumed in transmitting the data in order to maximize a portion of the available output power usable to transmit data. Minimizing the ratio of peak to average power may provide for the transmitted data rate to be increased, a transmission range to be increased, and/or reducing the power used by a transmitter to transmit the data. Reducing the power used by a transmitter to transmit data may be effected by synthesizer stopping and/or communications buffering as will be described. Moreover, optimizing the data rate at which data is transmitted over a communication link may be accomplished by an adaptive data rate methodology described herein.

Further, in accordance with certain embodiments of the present disclosure, there are provided various methodologies, devices, and systems that employ power-efficient receive communications comprising: determining available output power of an electrical power source, and receiving data at a data rate determined, at least in part, by the available output power. The ratio of peak to average power consumed in receiving the data may be minimized in order to maximize a portion of the available output power usable to receive data. Minimizing the ratio of peak to average power allows reception at a higher data rate, an increase in reception range, and/or a reduction in power consumed by a receiver to receive the data. For example, with a reduced peak-to-average power ratio, more of the available power may be allocated to a low noise amplifier (LNA) to enable reception at a higher data rate or an increase in reception range. As will be described, selectively turning on a low noise amplifier (LNA) of the receiver increases the reception range of the receiver.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring now to FIG. 1, a system functional block diagram 100 in accordance with various embodiments is illustrated. In this system, electrical power source 110 is coupled to electrical power monitoring circuit 120 via power line 155. Electrical power monitoring circuit 120 is coupled to transmitter 140 via power line 160, to receiver 150 via power line 165, and to controller 130 via signal line 170. Controller 130 is coupled to transmitter 140 via signal line 175 and to receiver 150 via signal line 180. Transmitter 140 is coupled to antenna 185 via coupling 145, and receiver 150 is coupled to antenna 190 via coupling 195 as shown. Controller 130 may be a processor, programmed processor, microcomputer such as a MCU, or the like.

In operation, electrical power from electrical power source 110 (for example, an energy-harvesting electrical power source) is drawn by transmitter 140 and receiver 150 via power line 155, electrical power monitoring circuit 120, and power lines 160 and 165, respectively. Electrical power monitoring circuit 120 sends information on the power drawn through power line 155 to controller 130 through signal line 170. Based at least in part on the information received through signal line 170, controller 130 controls transmitter 140 via signal line 175 to keep the power drawn through power line 155 below the power available from electrical power source 110. In response to the control on signal line 175, transmitter 140 may, e.g., reduce power available to an internal high-power circuit such as a power amplifier (and thereby reduce its power output to antenna 185 via coupling 145), so that the power drawn from power line 160 and, therefore, power line 155, is reduced.

Similarly, controller 130 also controls receiver 150 via signal line 180 to keep the power drawn through power line 155 below the power available from electrical power source 110. In response to the control on signal line 180, receiver 150 may, e.g., reduce power available to an internal high-power circuit such a low-noise amplifier (and thereby reduce its sensitivity to signals from antenna 190 via coupling 195), so that the power drawn from power line 165 and, therefore, power line 155, is reduced. Therefore, in accordance with various embodiments, a receive method comprises: determining available output power of an electrical power source, and adjusting the sensitivity of a receiver in accordance with the determined available output power. Adjusting the sensitivity of the receiver may further comprise adjusting the power consumption of the receiver. Further, the reception range of the receiver can be controlled by selectively turning on a low noise amplifier (LNA) of the receiver to increase the power consumption of the receiver and to increase the reception range of the receiver.

Those of ordinary skill in the art will recognize that one of transmitter 140 and receiver 150 may be deleted; that transmitter 140 and receiver 150 may share common circuitry, forming a transceiver; and that transmitter 140 and receiver 150 may share a single antenna, without departing from the spirit and scope of the disclosed embodiment. In accordance with various embodiments, then, a system may be scaled to have any desired number of devices, such as wireless EH transmitters, receivers, transceivers, and the like.

Those of ordinary skill in the art will further recognize that the functionality represented by electrical power monitoring circuit 120 in the system may be provided a number of ways. The electrical power source 110 may be self-monitoring in the sense that it can communicate its present power sourcing ability to other devices in the system, particularly helpful if the ability of the electrical power source 110 to provide power lessens; in such an implementation, the electrical power monitoring circuit need not be physically separate from the electrical power source 110. Alternately, the functionality of electrical power monitoring circuit 120 may be satisfied by a knowledge by a device, such as a receiver, transmitter, or transceiver of the power rating of the electrical power source 110; the device would then know that the available output power can be no greater than the power rating of the electrical power source 110. For example, a transmitter 140 or a receiver 150 would know to draw no more than 150 mW if power source is rated at 150 mW. Moreover, electrical power monitoring circuit 120 may reside on the wireless device itself and so could be part of the functionality of the transmitter 140 and the receiver 150, for example.

Figure 2:
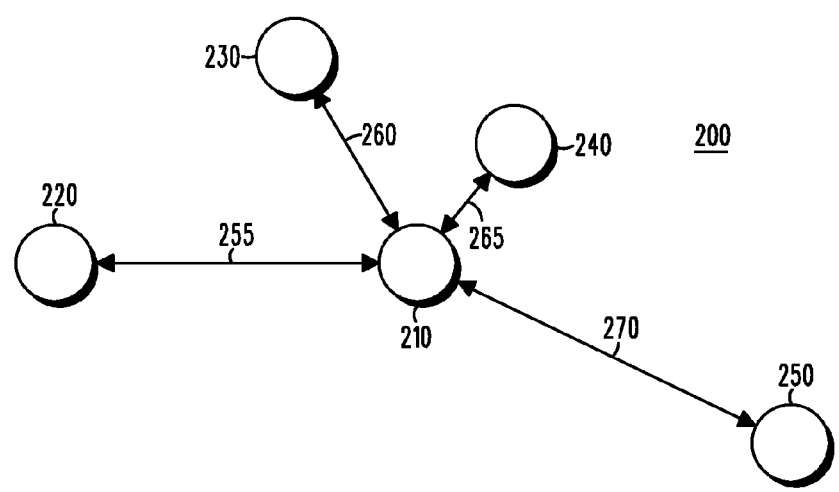
FIG. 2 is a wireless network system arranged in a STAR topology, in accordance with various representative embodiments.
Figure 3:
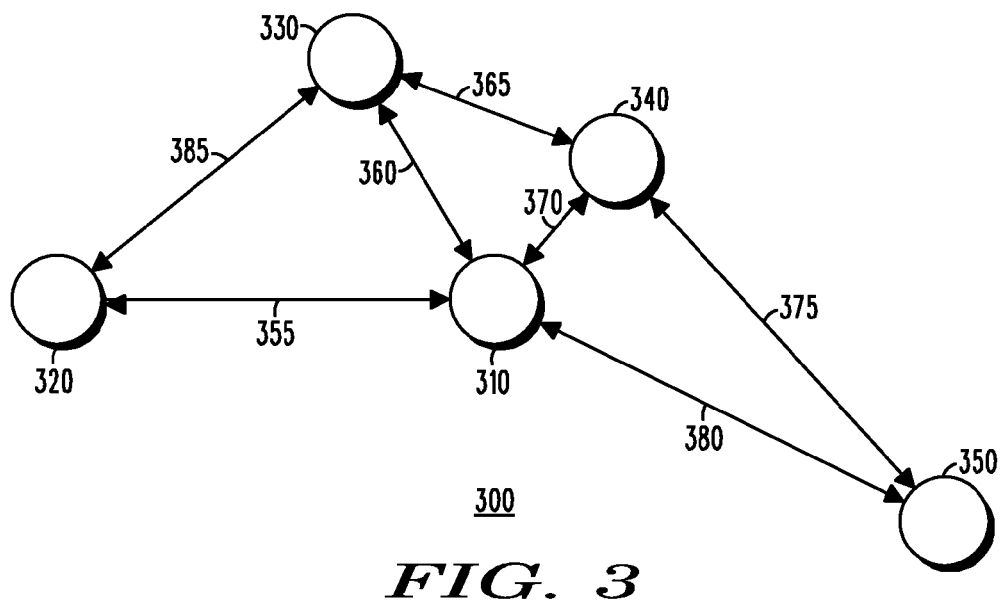
FIG. 3 is a wireless network system arranged in a Peer-to-Peer topology, in accordance with various representative embodiments.

Referring now to FIG. 2, a wireless network system 200 having a number of slave devices 220, 230, 240, 250, capable of being in exclusive communication with master device 210 over communication channels or links 255, 260, 265, 270, respectively, is shown in accordance with various embodiments. The slave devices 220, 230, 240, 250 are arranged in a star topology about master device 210. The devices 210-250 may be wireless receivers, transmitters, receivers, including EH devices, of the type illustrated and described herein. In FIG. 3, a wireless network system 300 having a number of devices 310, 320, 330, 340, 350 arranged in a peer-to-peer topology in accordance with various embodiments is illustrated. In network 300, each device 310-350 may communicate with any other device within range via their respective communication links or channels 355, 360, 365, 370, 375, 380, 385. The devices 310-350 may be wireless receivers, transmitters, receivers, including EH devices, of the type illustrated and described herein. As used herein, the term channel encompasses channel of varying types such as frequency, time, coding and any other channelization schemes.

In accordance with various embodiments provided herein, the transmission data rate of such systems is scaled in accordance with the available output power available from an electrical power source.

The EH-Optimum Device

Moving more specifically to wireless systems, there are certain characteristics of interest of an EH-optimum wireless device. Again, as will be apparent, an optimum wireless device may encompass wireless receivers, transmitters, receivers, including EH devices, of the type illustrated and described herein.

When there is no data to send, the receiver may be constantly on, drawing any power up to the maximum the source can supply. In this way, data may be "pulled" from the device, on demand.

The transmitted RF power may be set to a value such that the transmitter's peak DC power consumed is at or below the maximum the source can supply. Since nothing is gained by going below the maximum, except that range is reduced, in the optimum device it is set to maximum. To increase range, rather than increase the transmitted RF power the transmitted data rate is reduced, instead—either by lengthening the bit duration, or by including redundancy through coding (either of which increases the energy per information bit, for a constant RF power).

In digital communication systems, receiver sensitivity refers to the received signal power needed to correctly detect and decode a signal. Improving the sensitivity allows the receiver to recover weaker signals, which in turn allows the signal transmission range between transmitter and receiver to be increased.

Consider the receiver sensitivity equation, which relates sensitivity to Boltzmann's constant (k, Joules/Kelvin), operating temperature (T, Kelvin), system noise figure (NF), detector sensitivity ($E_b/N_0$), and data rate ($R_b$, bits/s):

$$P_{Sens}(dBm) = kT + NF_{dB} + (E_b/N_0)_{dB} + 10\log(R_b) \quad (1)$$

The first two terms, kT and NF, are fixed characteristics of the receiver. However, the transmitted data rate can be adjusted, and its value directly influences sensitivity of a receiver. Each halving of the data rate reduces the required signal power by half, which for free-space propagation would increase the transmission range by about 40%.

The third term in Equation (1) is called detector sensitivity, and it is a measure of signal-to-noise ratio needed by the detector to achieve a certain performance level (e.g., 1% probability of bit error). For digital communication applications, detector sensitivity is primarily determined by the type of modulation and forward error correction (FEC) used to encode the transmitted signal. Both modulation and FEC can be adjusted by the transmitter in order to vary receiver sensitivity. An example of an adjustable modulation is M-FSK (M-ary frequency shift key), in which groups of B bits are encoded as one of $M=2^B$ different modulation tones. Larger values of M are more efficient and result in improved detector sensitivity.

Linear block codes are a class of FEC codes that improve detector sensitivity through the addition of parity bits to a message. The parity bits are produced using a linear operation on the message bits, and the added structure allows the receiver to correct bit errors occur during message reception and thereby improve sensitivity. A common block code example is the BCH(31,16) block code that adds 15 parity bits to a 16-bit message to create a 31-bit coded message. This particular code will correct up to three bit errors in a block, resulting in a sensitivity improvement of 2 dB in this example.

Each of the examples above illustrates how transmission range can be increased without increasing the transmitted RF power. Alternatively, the transmission range can be maintained at a desired level as the available transmission power varies.

The data is typically transmitted at the maximum rate supported by the channel (to minimize channel occupancy and be a good "RF neighbor" by improving coexistence with other denizens of the band), then the transmitter turns off and the receiver turns on—and remains on, until a request for data is received or more data to transmit is generated. As discussed herein, the term channel or link encompasses channels of varying types such as frequency, time, coding and any other channelization schemes.

The receiver must be capable of receiving a wide range of data rates: Since the typical battery-powered transmitter today has its transmit RF power variable over a 30 dB (1000×) range, the EH-powered transmitter must be capable of data rates covering the same 1000× range (e.g., bit times varying from 1 ms to 1 s). The receiver must be similarly capable of demodulating this range.

If the power sourced by the EH device varies over time, the transmitted RF power (and, to keep a constant range, the associated data rate) must vary as well. Predictive algorithms (including heuristics, neural networks, and averaging techniques) can assist here and are discussed more fully below.

Figure 4:
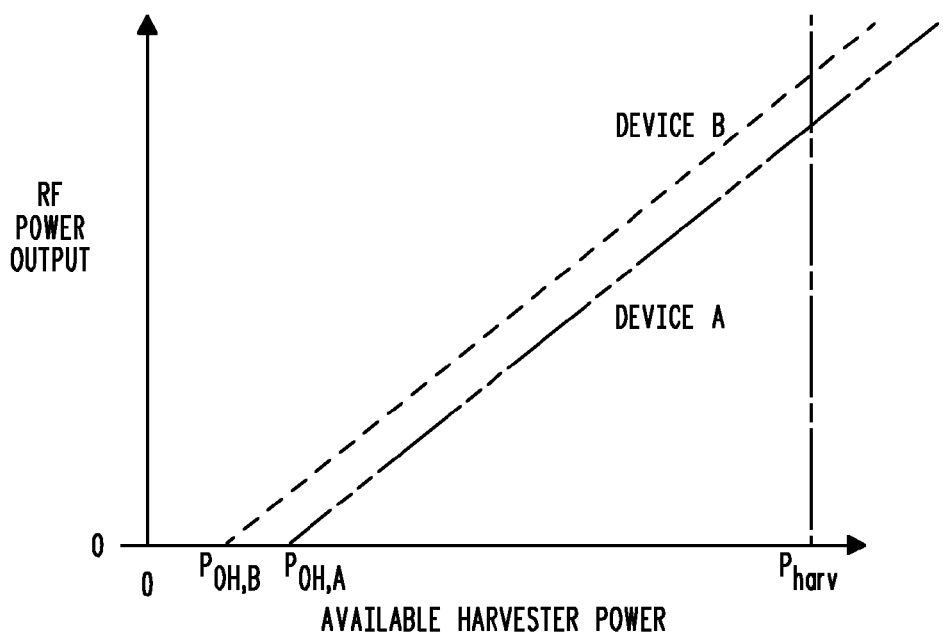
FIG. 4 illustrates RF power output versus available harvester power, in accordance with various representative embodiments.

The transmitter implementation can benefit from low "overhead" power consumption, so that the device converts DC power from the EH to RF power as efficiently as possible. There is no benefit for either the transmitter or the receiver to draw anything less than the maximum available power. Note that this implies that the power consumption of the two circuits should be substantially the same. From a marketing standpoint, however, it should be possible to vary the peak power consumption of both the transmitter and receiver by specific amounts, so that the capabilities of customers' different EH devices can be accommodated. In the transmitter this can be done by adjusting RF output power; in the receiver this can be done by adjusting current into a low noise amplifier (LNA) and, therefore, system noise figure (sensitivity). The LNA usually has the largest power consumption of any single block in the receiver (often 40% or more of the total power consumed). An illustration of the RF power output versus available harvester power is illustrated in FIG. 4 and discussed below.

One receiver architecture that minimizes peak power consumption is the amplifier-sequenced-hybrid, or ASH, receiver, illustrated in FIG. 5 and discussed more fully below. This architecture is a tuned-radio-frequency (TRF) receiver, except that the stages of RF amplification are separated by delay lines. To avoid instability, each amplifier is strobed active in sequence down the receiver chain. At the end of the chain the demodulator, also strobed, demodulates. In the ASH receiver, all but one stage of the receiver is on at a time, so its peak power is low. However, one has to implement delay lines (~500 ns), which typically are expensive surface-acoustic-wave (SAW) devices. Related techniques for transmitters, such as locking and latching synthesizers before transmitting, and buffering data so that an MCU can turn off before the PA turns on, are valuable, as will be described.

With the receiver always on, it is now possible to characterize one's RF environment (and one's neighboring devices) for identifying features and patterns useful for future operation. For example, neighbors can be identified by their frequency drift (chirp), interference can be avoided, etc. One can also use very long integration times to get very accurate ranging and, using these ranges, develop location estimates using, for example, the trilateration method, discussed in the following IEEE Industrial Electronics Conference Proceedings, which is hereby incorporated by reference: Luis Peneda, Abilio Azenha, and Adriano Carvalho, "Trilateration for Indoors Positioning Within the Framework of Wireless Communications," *Proceedings, 35$^{th}$ Annual Conference of IEEE Industrial Electronics*, 2009, pp. 2732-2737. For example, a received data rate of data transmitted by a first network device to a second network device can be determined, and a range between the two network devices estimated from the received data rate. The range can further be determined from an estimated transmit power of the first network device. The explicit transmission of an RSSI value is not needed to estimate the range, as will be described.

If device A has transmitted, and device B is to reply, device B can either (a) use the rate used by device A ("rate (a)"), or (b) use a rate determined by an RSSI value it develops for device A ("rate (b)"). A significant difference between rates (a) and (b) can be caused by three things:

1. A difference in transmitted power
2. A difference in receiver sensitivity, due either to a difference in implementation (conducted sensitivity), the noise floor, or an interference level at the two locations
3. A difference in total antenna gain between the B-to-A and A-to-B paths. (This last can only occur in the unlikely event that one or both of the devices has separate transmit and receive antennas.)

The variable data rate in effect provides ranging information, useful for determining distances between devices. Once the received data rate is determined, the range between the devices can be estimated—especially if the transmitted power is known—without the explicit transmission of a received RSSI value. This is, of course, useful in applications requiring location determination.

Without a priori knowledge of the transmit power of device A, device B can make a transmit power estimate of device A by assuming that any difference between rates (a) and (b) are due solely to a difference in transmit power. This apparently rash assumption can be justified by noting that in most implementations transmit power can vary greatly (30 dB or more), while equivalent variations in receiver sensitivity (even due to interference) over the long term are almost unknown. Device B can then make a ranging estimate based on rate (a), the estimated transmit power of device A just determined, and an assumed propagation model (as is known in the art). For example, one may look up the range for a received data rate stored in a table.

Device B can also check its noise and interference floor by determining an RSSI value when device A is not transmitting, or even on nearby, unused frequencies. An unusually high level may indicate nearby interference that could then be taken into the calculations.

One example of a ranging algorithm that may be employed by device B involves a characterization of its own receiver; specifically, the quality of its recovered information (e.g., bit error rate of the demodulated output) as the input signal strength is varied, for various data rates.

When multiple transmissions are made to a single device, it is useful to occasionally test the channel to see if a faster rate is possible. Since the rates are assumed to be arranged in octaves, much is to be gained by moving to a higher rate and, should the transmission fail, relatively little is to be lost (since the test transmission was sent at twice the previous rate, the failure takes half the time). Adaptive data rate algorithms for accomplishing this are discussed more fully below.

Overhead Power of Wireless Devices Powered by Energy Harvesters

The transmitter implementation can benefit from low "overhead" power consumption, so that the device converts DC power from the EH to RF power as efficiently as possible. As the RF power out is reduced, the power consumed by these circuits (e.g., frequency synthesizers, voltage regulators, etc.) becomes a larger and larger fraction of the total power consumed by the device until, at zero power output, this fraction reaches 100%.

Since overhead power must still be supplied by the energy harvester, but does not produce any power output, it should be minimized. As illustrated in FIG. 4, both devices A and B have the same transmit power amplifier, but the overhead power of Device B, $P_{OH,B}$, is lower than the overhead power of Device A, $P_{OH,A}$. If $P_{harv}$ is the power available from a particular energy harvester, Device B has at least two advantages over Device A:

1. At any given available harvester power above $P_{OH,B}$, the RF power output of Device B is greater than that of Device A, implying that it will have greater range; and
2. There exists a range of available harvester powers, between $P_{OH,B}$ and $P_{OH,A}$, in which Device B will have a nonzero RF power output, but Device A will not. Values of $P_{harv}$ in this range may be due to a particular market application or harvesting technology; for these situations Device B would be the practical device to use.

A Receiver Implementation (ASH Receiver)

Figure 5:
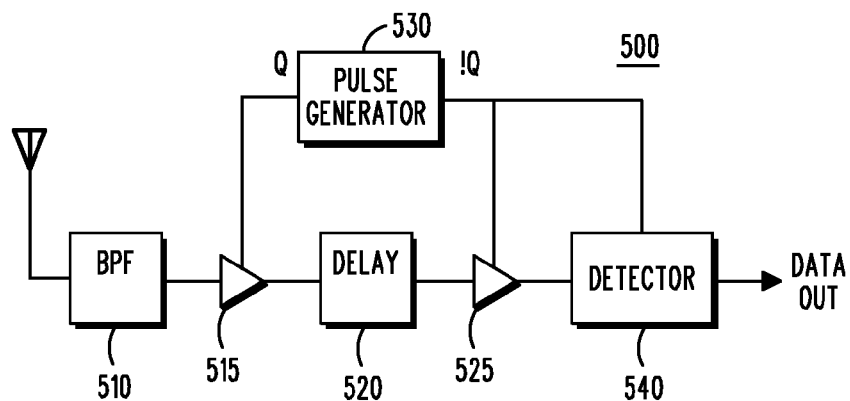
FIG. 5 is a block diagram of an ASH receiver, in accordance with various representative embodiments.

A block diagram 500 for the ASH receiver, a receiver architecture especially suitable for low peak power applications, is shown in FIG. 5. In this receiver 500, the received signal passes through a band pass filter (BPF) 510, and then into an RF amplifier 515. The signal then passes through a delay element 520, which may be 500 ns, for example, then a second RF amplifier 525 before being detected by detector 540. To avoid instabilities due to the amount of RF gain present (such as more than 80 dB), the amplifiers 515 and 525 are not enabled at the same time; the pulse generator 530 sends an enable signal Q to the first amplifier 515 at the same time that it sends a disable signal !Q to the second amplifier 525. After a time substantially the same as the delay time of the delay element, the pulse generator 530 sends a disable signal to the first amplifier 515 and simultaneously sends an enable signal to the second amplifier 525. After a similar time, the process then repeats. In this way, by the use of the delay element 520 it is possible to have all of the receiver gain at RF, while maintaining stability since only a portion of the gain is enabled at any given time.

A heretofore underappreciated feature of the ASH receiver, however, is that sequencing the amplifiers of the ASH receiver also reduces the peak power used by the receiver—the two gain stages are not active simultaneously. The ASH receiver in accordance with this embodiment therefore has the gain of a two-stage amplifier while having the peak power of a one-stage amplifier. This feature makes it particularly advantageous for EH-powered systems.

Synthesizer Stopping

Another technique useful to minimize a peak-to-average power ratio in receivers and transmitters and thus lower overhead power consumption, is synthesizer stopping disclosed in accordance with various embodiments. A peak-to-average power ratio used by a transmitter to transmit data, for example, may be reduced by selectively controlling operation of the transmitter such that a synthesizer and a transmit signal path of the transmitter do not simultaneously operate during a transmit period of the transmitter. The transmitter may comprise a synthesizer, a controlled oscillator, such as a voltage-controlled, numerically-controlled, current-controlled oscillator or the like, and a sequencer operable to generate a plurality of enable signals that control operation of the synthesizer, the controlled oscillator, and a transmit signal path of the transmitter. The sequencer is operable to selectively control operation of the transmitter to prevent simultaneous operation of the synthesizer and the transmit signal path during a transmit period of the transmitter. In certain embodiments, the sequencer is operable to generate a first enable signal that enables the synthesizer, a second enable signal that enables the controlled oscillator, and a third enable signal that enables the transmit signal path of the transmitter. During a warm-up period of the transmitter the sequencer is operable to activate the first enable signal to enable the synthesizer and the second enable signal to enable the controlled oscillator, wait until the synthesizer is locked, and deactivate the first enable signal and activate the third enable signal to enable the transmit signal path during the transmit period of the transmitter, and deactivate the second enable signal and the third enable signal following the transmit period of the transmitter, as will be described.

Similarly, the power used by a receiver to receive data may be reduced by selectively controlling operation of the receiver such that a synthesizer and a transmit signal path of the receiver do not simultaneously operate during a receive period of the receiver. A receive may comprise a synthesizer, a controlled oscillator, and a sequencer operable to generate a plurality of enable signals that control operation of the synthesizer, the controlled oscillator, and a receiver signal path of the receiver. The sequencer is operable to selectively control operation of the receiver to prevent simultaneous operation of the synthesizer and the receiver signal path during a receive period of the receiver. In certain more specific embodiments, the sequencer is operable to generate a first enable signal that enables the synthesizer, a second enable signal that enables the controlled oscillator, and a third enable signal that enables the receiver signal path of the receiver. During a warm-up period of the receiver, the sequencer is operable to activate the first enable signal to enable the synthesizer and the second enable signal to enable the controlled oscillator, wait until the synthesizer is locked, and deactivate the first enable signal and activate the third enable signal to enable the receiver signal path during the receive period of the receiver, and deactivate the second enable signal and the third enable signal following the receive period of the receiver.

Figure 6:
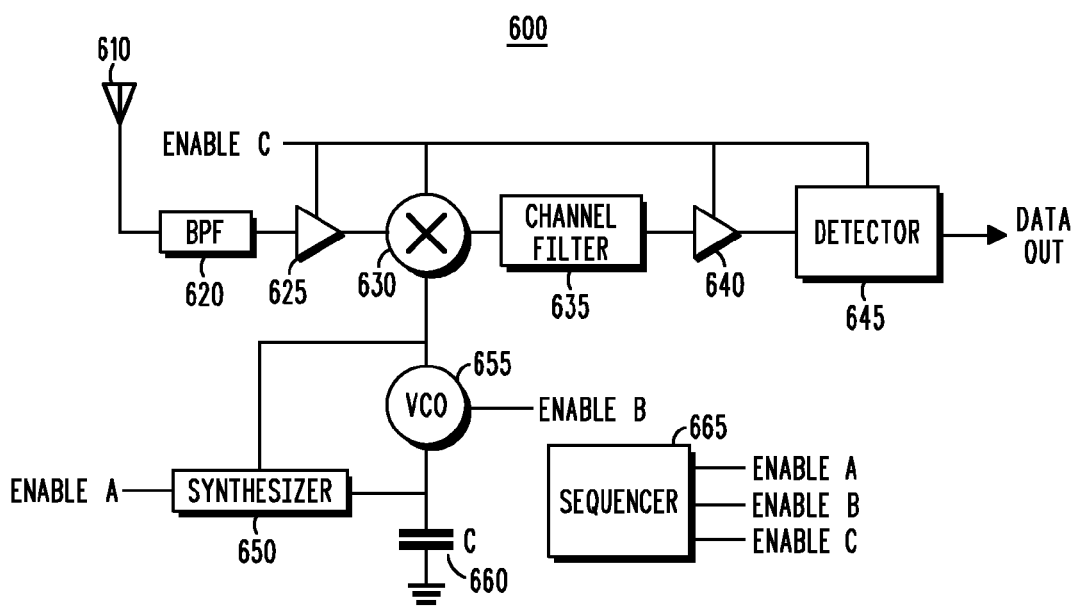
FIG. 6 is a block diagram of a superheterodyne receiver, in accordance with various representative embodiments.

In the exemplary receiver 600 shown in FIG. 6, a phase-locked-loop synthesized, single-conversion superheterodyne receiver is shown. A sequencer generates three enable signals, one for the synthesizer, one for the controlled oscillator, and one for the rest of the receiver. The receiver 600 has a band-pass filter (BPF) 620, amplifiers 625, 640, mixer 630, channel filter 635, detector 645, synthesizer 650, voltage controlled oscillator (VCO) 655, storage element 660, and sequencer 665. Storage element 660 may be, for example, a capacitor or a data memory such as a digital register.

At the beginning of the warm-up period of receiver 600, the sequencer activates the Enable A and Enable B signals, enabling the synthesizer 650 and the VCO 655. Once the phase-locked loop comprised of synthesizer 650, storage element 660 and VCO 655 is locked, and just before the desired signal is expected, the sequencer 665 activates the Enable C signal, which enables the receiver signal path, including amplifiers 625, 640, mixer 630 and detector 645. In a conventional design, the synthesizer 650 would remain enabled through the entire receive period, only being disabled when the receiver goes back to sleep. However (and especially when the receiver is only to be activated for brief periods), it is frequently possible to turn off the synthesizer 650 after the loop is locked, by deactivating the Enable A signal. The VCO control voltage is then maintained throughout the reception period on storage element 660. In this "synthesizer stopping" technique the synthesizer 650 and the receiver signal path 670 are never simultaneously active, so the peak power consumed by the system is reduced. Since the synthesizer can draw a significant amount of power, this reduction also can be significant. It is noted that the phase-locked loop is just one type of synthesizer that may be used and the use of a phase-locked loop in this embodiment is meant for purposes of illustration and not limitation.

Figure 7:
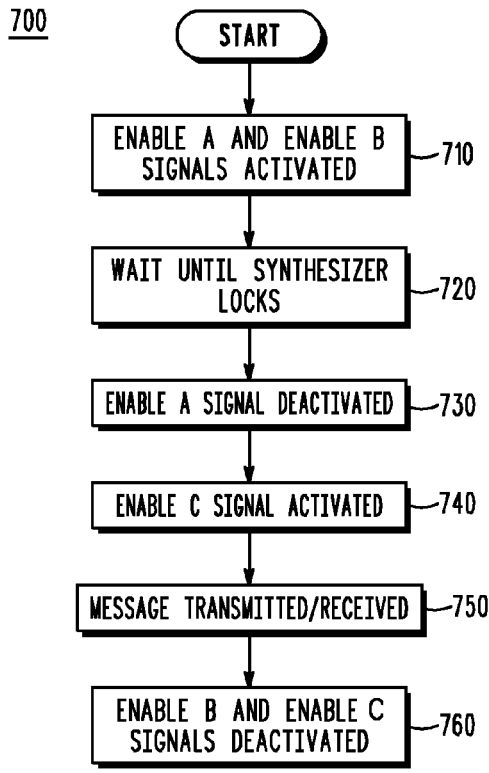
FIG. 7 is a flowchart of synthesizer stopping, in accordance with various representative embodiments.

An exemplary synthesizer stopping algorithm in accordance with various embodiments is illustrated in flow 700 of FIG. 7. At Block 710, the Enable A and Enable B signals are activated, enabling the synthesizer 650 and VCO 655. At Block 720, the system waits until the synthesizer, which may comprised of a phase-locked loop as previously discussed, locks. At Block 730, the Enable A signal is deactivated, disabling the synthesizer 650. At Block 740, the Enable C signal is activated, enabling the signal path of the receiver (or transmitter). At Block 750, the message is received (or transmitted), and at Block 760, the Enable B and Enable C signals are deactivated, disabling the VCO 655 and the signal path 670 and putting the device to sleep. This algorithm may then be repeated indefinitely.

Figure 8:
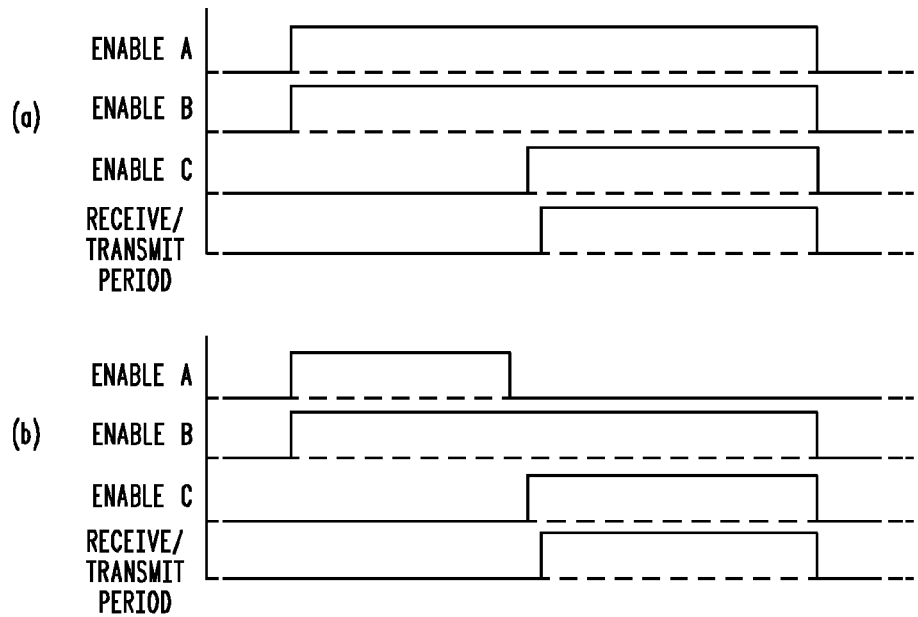
FIGS. 8($a$) and 8($b$) are timing diagrams of sequencer control signals, in accordance with various representative embodiments.

The timing diagrams of FIG. 8 illustrate the behavior of the sequencer control signals in a conventional design (FIG. 8a), and in a design in accordance with embodiments described herein that use synthesizer stopping (FIG. 8b). This synthesizer stopping technique is not limited to superheterodyne receivers; it may be used in all types of receivers, and also in transmitters.

Figure 9:
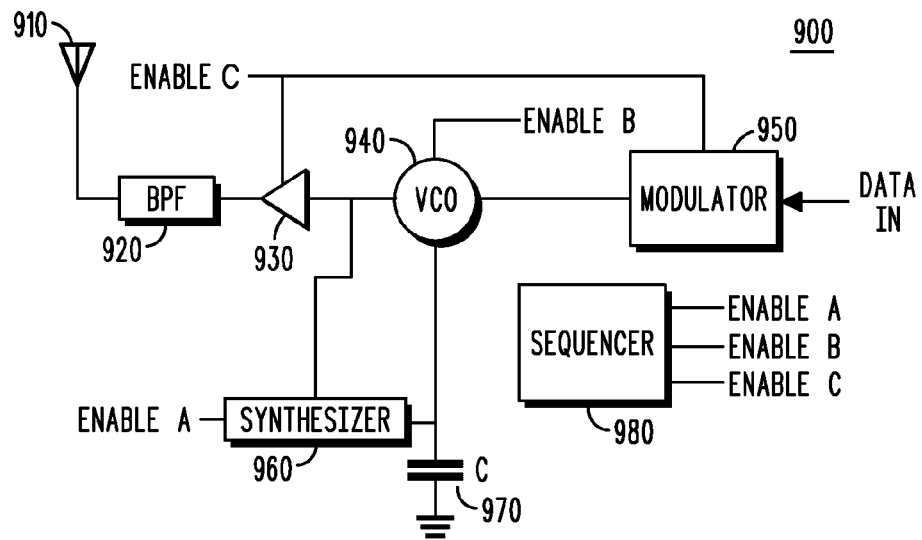
FIG. 9 is a block diagram of a transmitter capable of synthesizer stopping, in accordance with various representative embodiments.

A transmitter with synthesizer stopping is illustrated in block diagram 900 of FIG. 9. Transmitter 900 comprises antenna 910, BPF 920, amplifier 930, VCO 940, modulator 950, synthesizer 960, storage element 970, and sequencer 980 as shown. Operation is very similar to the receiver described in connection with FIG. 6; the synthesizer 960 and VCO 940 are enabled first, then, just before the transmit signal path 990 including amplifier 930 and modulator 950, is enabled, the synthesizer 960 is disabled and the VCO 940 remains controlled by the value stored on storage element 970.

Communication Buffering

Another way in which a peak-to-average power ratio may be reduced is by ensuring that the system microcomputer or Micro Controller Unit (MCU) is not active when the transceiver is active. This may be accomplished through the use of communication buffering, in accordance with yet other embodiments described herein. As used herein, the terms buffer, buffering, receive buffers, transmit buffers, and the like, refer to the buffering of data, such as data packets, in storage, which may a buffer register of the transceiver, any suitable memory technology such as a random access memory (RAM), Read Only Memory (ROM), Flash memory, Electrically Erasable Programmable Read Only Memory (EEPROM), mass storage such as a hard disc drive, floppy disc drive, optical disc drive or may accommodate other electronic storage media, and non-volatile memory (NVM). The memory may be active memory or may permanently reside in ROM, EEPROM or Flash memory, for example.

In accordance with certain embodiments, a peak-to-average power ratio used by the transmitter to transmit the data may be reduced by selectively controlling operation of a microcomputer and the transmitter such that the microcomputer and the transmitter do not simultaneously operate. In certain embodiments, this may be accomplished by the microcomputer placing a prepared data packet in a transmit buffer of the transmitter while the transmitter is in a lower-power mode such as a transmitter sleep mode, the microcomputer going into a lower-power mode such as a microcomputer sleep mode, the transmitter waking up and transmitting the prepared data packet in the transmit buffer, and following transmittal of the prepared data packet, the transmitter going into the transmitter lower-power mode. The transmit buffer may be a transmit buffer register of the transmitter, a random access memory, and a non-volatile memory, for example.

Similarly, communication buffering may be employed to reduce a peak-to-average power ratio used by the receiver to receive the data by selective control of the operation of a microcomputer and the receiver to prevent simultaneous operation of the microcomputer and the receiver during a receive period of the receiver. In more specific embodiments, the receiver may wake up to receive a data packet while the microcomputer is in a lower-power mode such as a microcomputer sleep mode, place the received data packet in a receive buffer of the receiver, and go into a lower-power mode such as a receiver sleep mode after placement of the received data packet in the receive buffer. The microcomputer wakes up to process the received data packet and then returns to the lower-power microcomputer mode following processing of the received data packet, as will be described. The receive buffer may be a receive buffer register of the receiver, a random access memory, and a non-volatile memory, for example.

Figure 10:
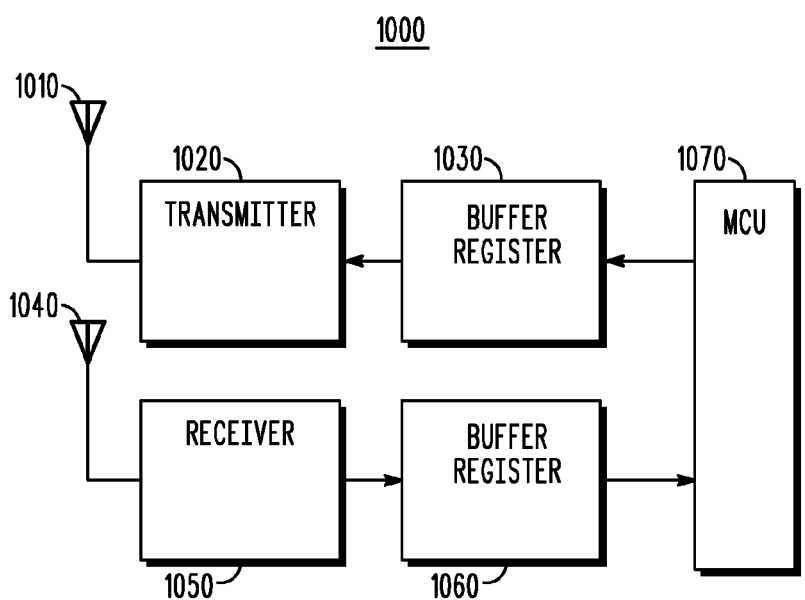
FIG. 10 is a block diagram that illustrations communication buffering, in accordance with various representative embodiments.

One way of accomplishing communication buffering is the use of buffer registers, as illustrated in block diagram 1000 of FIG. 10. Block diagram 1000 comprises two antennas, 1010, 1040, a transmitter 1020, a buffer register 1030 coupled to transmitter 1020, a receiver 1050, a buffer register 1060 coupled to receiver 1050, and MCU 1070 coupled to buffer registers 1030, 1060. The MCU 1070 prepares the data packet to be transmitted, places it in the transmit buffer register 1030, then goes to sleep. The transmitter 1020 then wakes up, takes the packet from the buffer register 1030, and transmits it. Similarly, when the receiver 1050 receives a packet, it places it in the receive buffer register 1060, then goes to sleep. The MCU 1070 then wakes up, takes the packet from the buffer register 1060, and processes it. In this way, neither the transmitter 1020 nor the receiver 1050 is active (operational) when the MCU 1070 is active, reducing peak currents and therefore power used.

Figure 11:
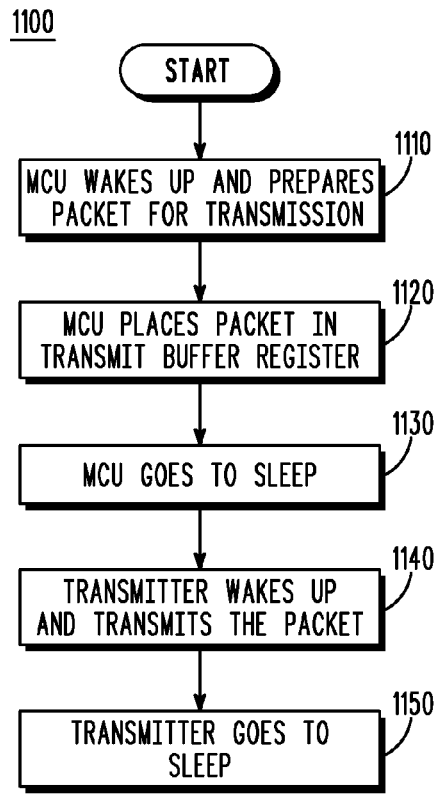
FIG. 11 is a flowchart that illustrates communication buffering for a transmitter, in accordance with various representative embodiments.

An exemplary flow 1100 for transmission is illustrated in FIG. 11 in accordance with various embodiments. At Block 1110, the MCU wakes up and prepares a packet for transmission. At Block 1120, the MCU places the prepared packet in the transmit buffer register, then goes to sleep at Block 1130. At Block 1140, the transmitter wakes up and transmits the packet, then goes to sleep at Block 1150. This flow may then be repeated indefinitely.

Control of each block (e.g., ensuring that Block 1130 ends before Block 1140 begins) may be achieved by a simple state machine, by dedicated control lines (e.g., an active-low "wake up" control line from the MCU to the transmitter, normally driven high, with a pull-down resistor so that it becomes active when the MCU goes to sleep), by a timer (e.g., a ripple counter, with an output control line for each block), or by other means.

Figure 12:
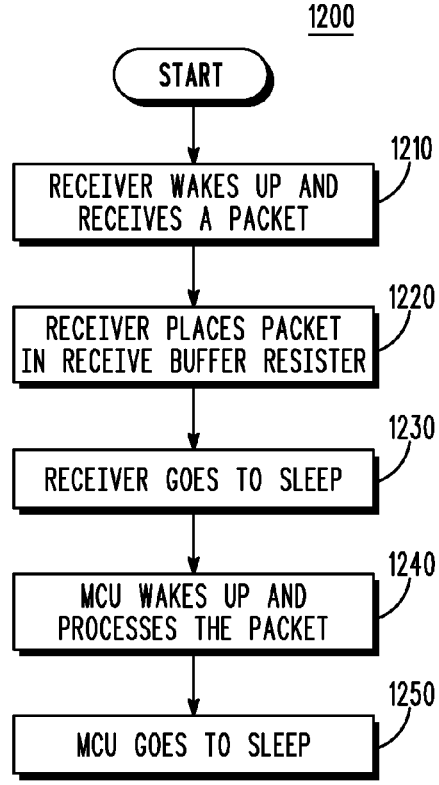
FIG. 12 is a flowchart that illustrates communication buffering for a receiver, in accordance with various representative embodiments.

An exemplary flow 1200 for communication buffering for reception is illustrated in FIG. 12 in accordance with various embodiments. At Block 1210, the receiver wakes up and receives a data packet. At Block 1220, the receiver places the received packet in the receive buffer register, then goes to sleep at Block 1230. At Block 1240, the MCU wakes up and processes the packet, then goes to sleep at Block 1250. This flow may then be repeated indefinitely.

Control of each block (e.g., ensuring that Block 1230 ends before Block 1240 begins) may be achieved by a simple state machine, by dedicated control lines (e.g., an active-low "wake up" interrupt signal from the receiver to the MCU, normally driven high, with a pull-down resistor so that it becomes active when the receiver goes to sleep), by a timer (e.g., a ripple counter, with an output control line for each block), or by other means.

Communication buffering may be most practical when there is a known upper bound on the size of the packets (so that the buffers can be sized so that they cannot overflow), and when the latency associated with the serial handling of the packets can be tolerated.

Predictive Algorithms

If the power sourced by the EH device varies over time, to avoid interruptions of service the transmitter must be able to predict decreases in available power in advance. In this way it may reduce its transmitted RF power (and its data rate) before the transmission of a packet begins. Ideally, it should be able to predict these decreases far enough in advance that it has time to inform a receiving device of the incipient data rate change, so that the receiving device is not surprised by the data rate change and suffer a loss of data (which may last until it reacquires the new data rate).

Also ideally, the EH device would be able to inform the transmitter of impending changes to its available power, but that is often not the case in practical systems, which often lack a communications link between the EH device and the load it powers. In these cases, the wireless device must employ some type of predictive algorithm to estimate future power availability.

One algorithm that may be used is a simple heuristic: If the supplied voltage falls below a predetermined threshold, the wireless device may conclude that the outlook for future power is bleak, and respond accordingly. This may happen, for example, when the engine supplying a vibration-based EH system is shut down at the end of a working shift. Another approach would be to monitor and record the available power over time, and make diurnal correlations. If the time is 4:59 PM, and the average power available for the last ten days during the 5 PM minute is significantly lower than that in the 4:59 minute, the device may reduce its transmitted data rate (perhaps after first announcing the change to its receiving device) in expectation of the same reduction today.

Therefore, in accordance with various embodiments disclosed herein a predictive methodology may be employed to determine the available output power of an electrical power source by predicting a future value of the available output power of the electrical power source. This may include prior to transmitting data, changing the transmit power of a transmitter and/or a data rate of the transmitter in accordance with the predicted future value of the available output power of the electrical power source. A receive may be notified of the changed data rate of the transmitter. As mentioned, predicting a future value of the available output power of the electrical power source further may comprise the use of a plurality of prior values of the available output power of the electrical power source or the use of a predictive algorithm. As will be described, the predictive algorithm may use at least one curve-fitting technique, a linear extrapolation, or the use of a heuristic.

Figure 13:
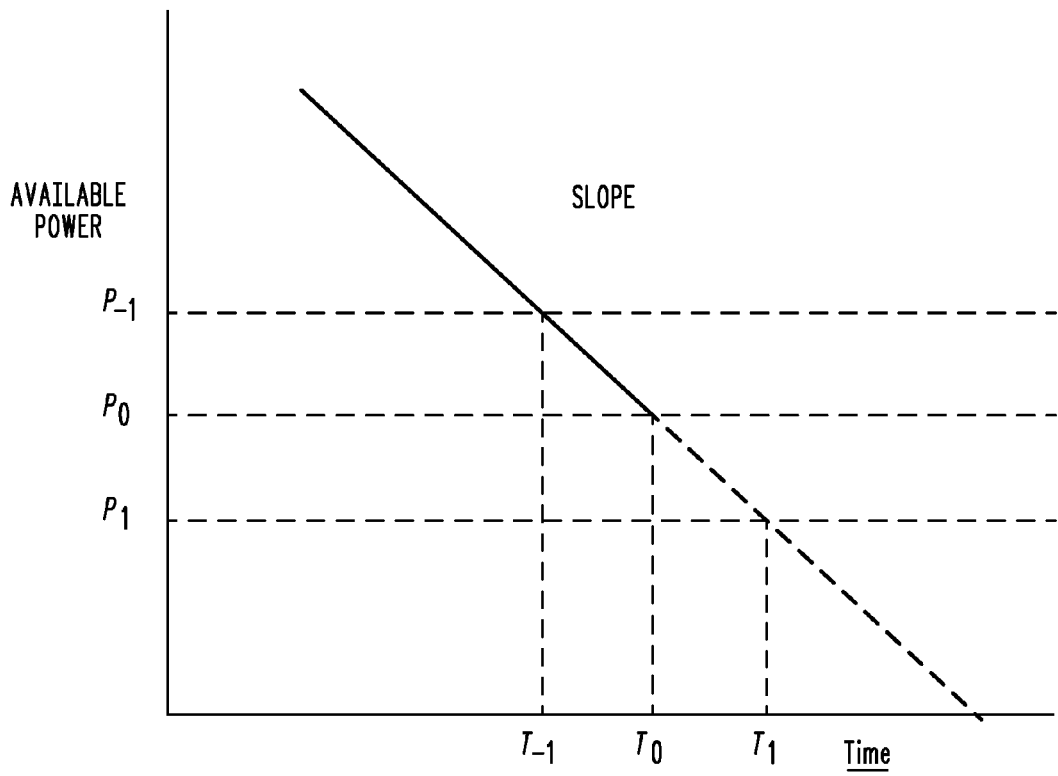
FIG. 13 is a graph of an example of linear extrapolation as a predictive algorithm, in accordance with various representative embodiments.

Consider, the example of a predictive algorithm using linear extrapolation as shown in FIG. 13, in accordance with various embodiments. In this case, the history of available power is linearly extrapolated to estimate its future value.

The device determines the power available from its source from time to time. For example, at time $T_{-1}$ the available power is $P_{-1}$ W, and at time $T_0$ the available power is $P_0$ W. The available power is seen to be linearly decreasing with time, at a rate of $$m := \frac{(P_0 - P_{-1})}{(T_0 - T_{-1})} \text{ W/s}. \tag{2}$$

At time $T_0$, a prediction (estimate) of the power available at time $T_1$ can be made by extrapolating the line:

$$P_1 = m(T_1 - T_0) + P_0 W. \tag{3}$$

Those of ordinary skill in the art will recognize that standard curve-fitting techniques including, but not limited to, averaging, smoothing, and the method of least squares, may be used to fit a line or other curve to the measured available power data, and to estimate m, $P_1$, and perhaps other curve-fitting parameters.

Figure 14:
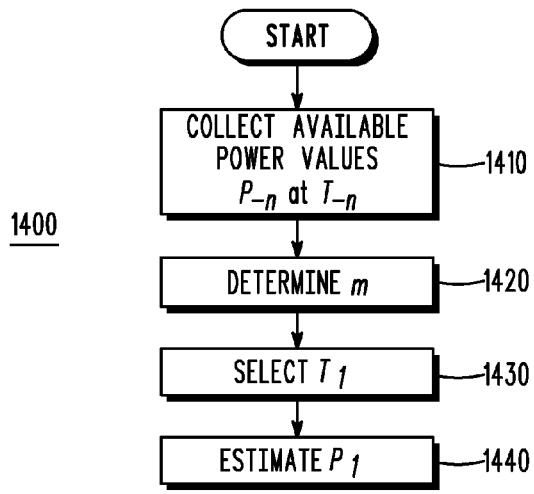
FIG. 14 is a flowchart that illustrates an exemplary predictive algorithm, in accordance with various representative embodiments.

An exemplary predictive flow 1400 is illustrated in FIG. 14 in accordance with various embodiments. At Block 1410, the device collects an available power value at least two different times. At Block 1420, m is determined, using Equation (2). Next a time $T_1$, for which the available power estimate is to be made, is selected at Block 1430. This can be, for example, a time at which a message is to be sent. Finally, the estimate $P_1$ is made at Block 1440, using Equation (3) above. This algorithm may then be repeated indefinitely.

Other predictive techniques could include the use of artificial neural networks (ANNs) to consider more input variables. Such variables could include the types, amounts, origins, and destinations of message traffic handled; environmental factors; and qualities of the power accepted from the EH device (variability, noise, etc.), as well as temporal factors. ANNs are adaptive, non-linear systems that learn to perform a desired function without external programming. During the training phase, the system parameters (typically connections and gains between the ANN's processing elements) of an ANN are changed to optimally align its behavior to a "learning rule" (e.g., to predict EH available power changes). Following this, the ANN is placed into service. The wireless device may then use the output of the ANN to determine the power of its next transmission.

Note that predictions of power increases are also useful: If a device can predict that its available power may soon increase, it may wish to delay the start of a transmission that would otherwise be made at a low output power (and, therefore, at a low data rate). It is possible that the message transmission will be completed sooner if the device waits until more power is available, and the message can be sent at a higher rate.

Non-linear, or polynomial, extrapolation, is also useful to predict future values of available power; in particular, the method of Lagrange polynomials (i.e., selection of the polynomial of least order that coincides with the historical values of available power) may be used for near-term predictions. As in most uses of polynomial extrapolation, however, caution must be exercised when making long-term predictions to avoid significant error.

Adaptive Data Rate

As previously mentioned, when multiple transmissions are made to a single device, it is useful to occasionally test the channel to see if a faster rate is possible. Since the rates are assumed to be arranged in octaves, much is to be gained by moving to a higher rate and, should the transmission fail, relatively little is to be lost (since the test transmission was sent at twice the previous rate, the failure takes half the time).

One task to be performed by a wireless device powered by an energy-harvesting source is to optimize its transmitted data rate over a given communication link or channel. It is advantageous to send or transmit at the maximum attainable rate, consistent with the device's power source and the quality of the transmission path or channel. The approaches disclosed herein that may be undertaken by a device to determine this rate, however, consistent with various embodiments, are not obvious. As discussed herein, the term channel encompasses channel of varying types such as frequency, time, coding and any other channelization schemes.

An adaptive data rate approach in accordance with an embodiment employs a variation of the Paging "20 page" sensitivity test method, such as that described in IEC 60489-6, Annex E, in which the transmitted power is reduced after some number of consecutive successful pages, and increased after one is missed. For EH-powered devices, the rule might be, "Start at the fastest possible rate. Decrement the rate with every missed acknowledgement message (ACK), until an ACK is received. Then attempt to send d consecutive packets, such as three consecutive packets, at the present rate. If successful (i.e., ACKs are received for all three), move to the next higher rate and attempt again. If unsuccessful with any one of the three (i.e., if an ACK is not received), immediately move to the next lower rate and attempt again." Thus, an adaptive data rate algorithm may be similar to an algorithm used to determine selective call sensitivity, modified so that the data rate of transmission is varied instead of the signal strength used to transmit.

Figure 15:
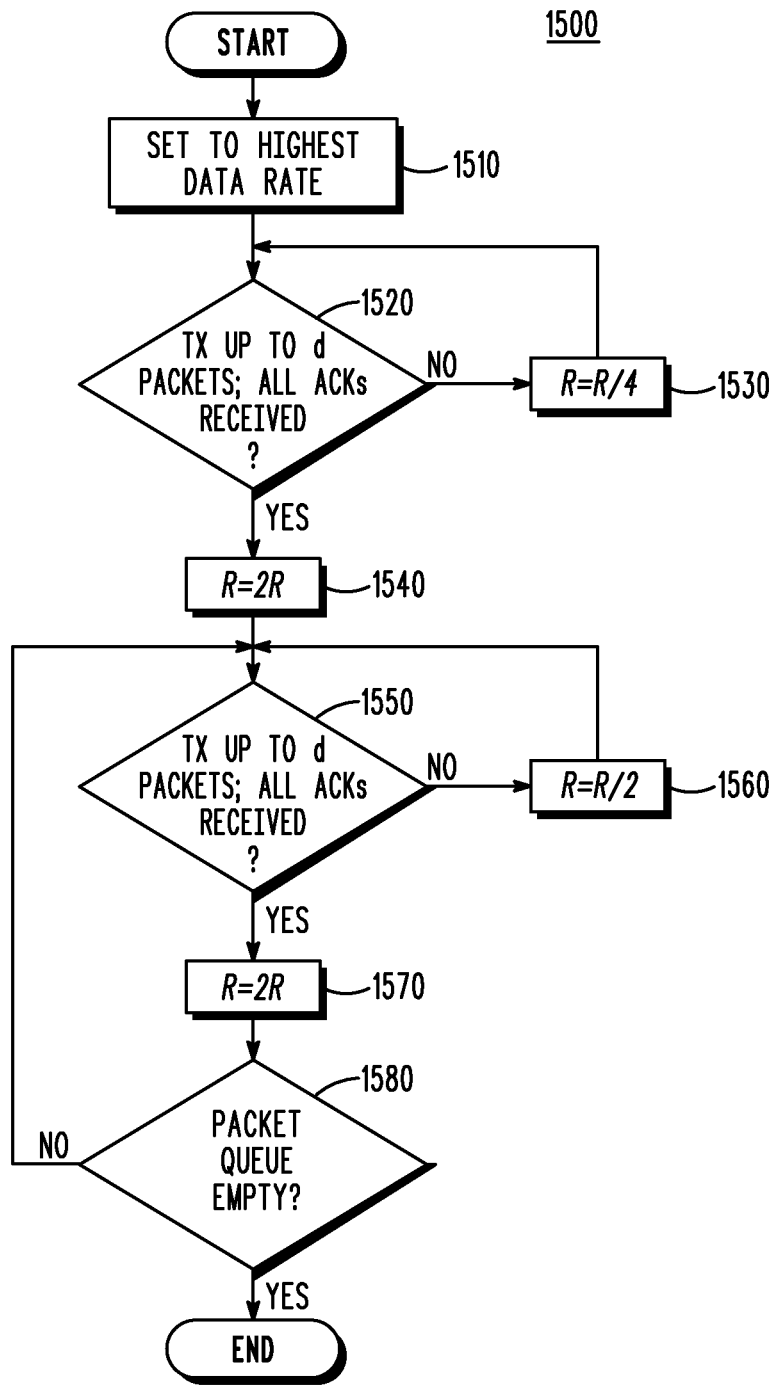
FIG. 15 is a flowchart that illustrates an adaptive data rate algorithm, in accordance with various representative embodiments.

Referring now to flow 1500 of FIG. 15, the methodology employed by the algorithm has two parts—a "fast" loop to quickly find a range of successful data rates, followed by a "slow" loop that adapts to environmental changes and the probabilistic nature of wireless reception, and during which the great majority of the packets sent are expected to be transmitted.

The algorithm starts when a set of packets appears in the transmit queue. At Block 1510, the transmitter sets its data rate R to its maximum value and, at Decision Block 1520, attempts to successfully send (i.e., receive the associated ACK from) d consecutive packets at this rate and determine if an ACK was received for each transmitted packet. If an ACK is not received after one of these transmissions, however, R is reduced to R/4 at Block 1530, the present packet is resent, and the count restarts.

If d consecutive packets are successfully sent (i.e., the ACKs were received), R is doubled to 2R (unless it is already at its maximum value, of course, in which case it remains unchanged) at Block 1540 and, at Block 1550, the transmitter again attempts to successfully send d consecutive packets at this rate. If it is determined at Decision Block 1550 that an ACK is not received after one of these transmissions, R is reduced to R/2 at Block 1560, the present packet is resent, and the count restarts.

If, however, it is determined at Decision Block 1550 that d consecutive packets are successfully sent (i.e., the ACKs were received), R is doubled to 2R (unless it is already at its maximum value, of course, in which case it remains unchanged) at Block 1570. At Decision Block 1580, the packet queue is checked; if it is not empty the flow returns to Decision Block 1550. If the queue is empty, the flow stops. In fact, the flow stops at any Block if the queue becomes empty.

The "speed" of the adaptive data rate flow 1500 of FIG. 15 is determined by the factor by which R is divided in Blocks 1540 and 1570. If the divisor is too great, however, the algorithm may skip over the "slow" range, and may take a relatively long time to recover. A "fast" value, such as 4 in Block 1530 ensures that the flow cannot skip the "slow" range.

Adaptive Data Rate, d=3

In accordance with an adaptive data rate algorithm, with d=3, the probability of transmitting at data rate n−1 is:

$$P_{n-1}=P_n \cdot [1-(P_n(\text{call}))^3]+P_{n-2} \cdot (P_{n-2}(\text{call}))^3 \quad (4)$$

where
  $P_n$, $P_1$, and $P_{n-2}$ are the probabilities of transmitting at data rates n, n−1, and n−2, respectively, and
  $P_n(\text{call})$ and $P_{n-2}(\text{call})$ are the probabilities of successfully receiving one packet, out of one transmitted, at data rates n and n−2, respectively.

In this analysis we make the simplifying assumption that acknowledgements (ACKs) are always received when sent. This can be justified by noting that ACKs are significantly shorter than most, if not all, data packets; should a data packet be received it is therefore likely that an ACK would also be received. A more detailed analysis, however, would have to consider the effect of probabilistic ACK reception.

We initially assume that the data rates are arranged in octaves, so that data rate n−1 is:

$$R_{n-1} = 2 \cdot R_{n-2} = \frac{R_n}{2},$$

where $R_n$, $R_{n-1}$, and $R_{n-2}$ are the data rates n, n−1, and n−2, respectively, in bits/s, and $R_n > R_{n-1}$.

The probabilities of individual packet reception form a relatively steep curve: As the data rates are doubled each time, the probability of reception quickly moves from substantially 100% to substantially 0%. An example of this behavior is shown in Table 1.

TABLE 1

Typical call probabilities for octaves of data rate.

| Rate | $P_i(\text{call})$ |
|---|---|
| $R_{n-3}$ | 1.000000000000000 |
| $R_{n-2}$ | 0.999999952462873 |
| $R_{n-1}$ | 0.987243370972121 |
| $R_n$ | 0.005177104881681 |
| $R_{n+1}$ | 0.000000000000000 |

The fact that rates less than $R_{n-2}$ have P(call)≈1.0 and those greater than $R_n$ have P(call)=0.0 can be used to simplify the probabilities:

$$P_n=P_{n+1}+P_{n-1} \cdot (P_{n-1}(\text{call}))^3$$

$$P_{n+1}=P_{n+2} \cdot [1-(P_{n+2}(\text{call}))^3]+P_n \cdot (P_n(\text{call}))^3$$

$$P_{n+2}=P_{n+3} \cdot [1-(P_{n+3}(\text{call}))^3]+P_{n+1} \cdot (P_{n+1}(\text{call}))^3$$

But $P_{n+1}(\text{call})$ and $P_{n+3}(\text{call})$ are both ≈0, so $P_{n+2}=P_{n+3}$. Since this argument applies for all $R>R_{n+2}$, and the sum of all the probabilities cannot exceed 1, $P_{n+2}=P_{n+3}$ must be zero. Similarly, $$P_{n-4}=P_{n-3} \cdot [1-(P_{n-3}(\text{call}))^3]+P_{n-5} \cdot (P_{n-5}(\text{call}))^3.$$

But $P_{n-3}(\text{call})$ and $P_{n-5}(\text{call})$ are both ≈1, so $P_{n-4}=P_{n-5}$. Since this argument also applies for all $R<R_{n-4}$, and the sum of all the probabilities cannot exceed 1, $P_{n-4}=P_{n-5}$ must be zero, too.

Starting from Equation (4), we can deduce that $$P_{n-3}=P_{n-2} \cdot [1-(P_{n-2}(\text{call}))^3]+P_{n-4} \cdot (P_{n-4}(\text{call}))^3.$$

But, since $P_{n-4}(\text{call})=0$, this simplifies to $$P_{n-3}=P_{n-2} \cdot [1-(P_{n-2}(\text{call}))^3]. \quad (5)$$

Starting again from Equation (4), we can also deduce that $$P_{n-2}=P_{n-1} \cdot [1-(P_{n-1}(\text{call}))^3]+P_{n-3} \cdot (P_{n-3}(\text{call}))^3.$$

After some simplification, and using Equation (5), $$P_{n-2} = \frac{P_{n-2} \cdot \lfloor 1 - (P_{n-2}(\text{call}))^3 \rfloor}{(P_{n-2}(\text{call}))^3}. \quad (6)$$

Similarly, and using Equation (6), we can determine that $$P_{n-1} = \frac{P_n \cdot \lfloor 1 - (P_n(\text{call}))^3 \rfloor}{(P_{n-1}(\text{call}))^3}. \quad (7)$$

Starting once again with Equation (4), we see that $$P_n = P_{n+1} \cdot [1-(P_{n+1}(\text{call}))^3] + P_{n-1} \cdot (P_{n-1}(\text{call}))^3.$$

However, from Table 1, we see that $P_{n+1}(\text{call})=0$. Combining this with Equation (7), we derive $$P_n = \frac{P_{n+1}}{(P_n(\text{call}))^3}. \quad (8)$$

To determine a value for $P_{n+1}$, we need to use the other boundary condition on the probabilities, i.e., that they must sum to 1. Since we know that $P_{n-4}, P_{n-5}, \ldots$ are all zero, and that $P_{n+2}, P_{n+3}, \ldots$ are all zero, it is sufficient to sum $P_{n-3}, P_{n-2}, P_{n-1}, P_n,$ and $P_{n+1}$:

$$P_{n-3}+P_{n-2}+P_{n-1}+P_n+P_{n+1}=1 \quad (9).$$

. . . using Equations (5) through (8).

After some manipulation, we conclude that $$P_{n+1} = \frac{B_n B_{n-1} B_{n-2}}{A_n A_{n-1} A_{n-2} + A_n A_{n-1} + A_n B_{n-2} + B_{n-1} B_{n-2} + B_n B_{n-1} B_{n-2}} \quad (10)$$

where the notation has been simplified by defining $$A_i = [1-(P_i(\text{call}))^3]$$

and $$B_i = (P_i(\text{call}))^3.$$

Using this value for $P_{n+1}$, and substituting back into Equations (8), (7), (6), and (5), in order (Table 2), we can determine the numerical values of $P_n$ through $P_{n-3}$. These values are summarized in Table 3. Note that the sum of the $P_i$s is unity, a comforting confirmation. The probability of reception of a packet at a given $R_i$ is then $P_i \times P_i(\text{call})$, and is shown in the final column of Table 3.

TABLE 2

Summary of the $P_i$s (original, cubic case).

| $P_i$ | Value |
|---|---|
| $\geq P_{n+2}$ | 0 |
| $P_{n+1}$ | $\dfrac{B_n B_{n-1} B_{n-2}}{A_n A_{n-1} A_{n-2} + A_n A_{n-1} + A_n B_{n-2} + B_{n-1} B_{n-2} + B_n B_{n-1} B_{n-2}}$ |
| $P_n$ | $\dfrac{P_{n+1}}{(P_n(\text{call}))^3}$ |
| $P_{n-1}$ | $\dfrac{P_n \cdot [1 - (P_n(\text{call}))^3]}{(P_{n-1}(\text{call}))^3}$ |
| $P_{n-2}$ | $\dfrac{P_{n-1} \cdot [1 - (P_{n-1}(\text{call}))^3]}{(P_{n-2}(\text{call}))^3}$ |
| $P_{n-3}$ | $P_{n-2} \cdot [1 - (P_{n-2}(\text{call}))^3]$ |
| $\leq P_{n-4}$ | 0 |

TABLE 3

Probability $P_i$ that a packet will be sent at a given data rate, and probability $P_i \times P_i(\text{call})$ that a packet will be received at a given data rate.

| Rate | $P_i(\text{call})$ | $B_i$ | $A_i$ | $P_i$ | $P_i \times P_i(\text{call})$ |
|---|---|---|---|---|---|
| $R_{n-3}$ | 1.000000000000000 | 1 | 0 | 2.6942E−09 | 2.6942E−09 |
| $R_{n-2}$ | 0.999999952462873 | 1 | 1.43E−07 | 0.018891884 | 0.018891883 |
| $R_{n-1}$ | 0.987243370972121 | 0.962216 | 0.037784 | 0.499999931 | 0.493621617 |
| $R_n$ | 0.005177104881681 | 1.39E−07 | 1 | 0.481108116 | 0.002490747 |
| $R_{n+1}$ | 0.000000000000000 | 0 | 1 | 6.6758E−08 | 0 |

By inspection of Table 3, we can see that approximately one-half of the packets sent by the device are sent at rate $R_{n-1}$, and that the remaining packets are almost all sent at $R_n$.

We emphasize that the $P_i$s represent the fraction of packets sent at the various data rates, not the fraction of time spent at each data rate. Thus, if one assumes that all packets sent have an equal number of bits, since the rates $R_i$ are arranged in octaves the device spends twice as much time sending a packet at rate $R_{n-1}$ than it does at rate $R_n$, and four times as much when at rate $R_{n-2}$.

Similarly, the $P_i \times P_i(\text{call})$ values represent the fraction of packets received at the various data rates.

The overall received data rate (throughput) $R_{oa}$ is then the fraction of time transmissions are received at each $R_i$, multiplied by the value of the relevant $R_i$, then summed over all the rates:

$$R_{oa} = \sum_i \frac{P_i T_i R_i P_i(\text{call})}{\Sigma_i (P_i T_i P_i(\text{call}))}$$

. . . where $T_i$ is the transmission duration of a packet at rate $R_i$. This calculation is shown in Table 4.

TABLE 4

The overall data rate $R_{oa}$.

| Rate $R_i$ | $P_i \times P_i(\text{call})$ | Packet Duration $T_i$ | Fraction of Reception Time Using $R_i$ | Overall bits/s |
|---|---|---|---|---|
| 0.125 $R_n$ | 2.6942E-09 | 8 $T_n$ | 2.02324E-08 | 2.529E-09 $R_n$ |
| 0.25 $R_n$ | 0.018891883 | 4 $T_n$ | 0.070935346 | 0.01773384 $R_n$ |
| 0.5 $R_n$ | 0.493621617 | 2 $T_n$ | 0.926726566 | 0.46336328 $R_n$ |
| 1 $R_n$ | 0.002490747 | 1 $T_n$ | 0.002338068 | 0.00233807 $R_n$ |
| 2 $R_n$ | 0 | 0.5 $T_n$ | 0 | 0 $R_n$ |
| | | | Overall Rate $R_{oa}$: | 0.48343519 $R_n$ |

The overall data rate of the protocol, $R_{oa}$, using the original parameters, is 48.3% that of the base rate $R_n$.

Adaptive Data Rate, d=1

Further optimization of this protocol for throughput is possible; for example, in Equation (4) the exponents of $P_n(\text{call})$ and $P_{n-2}(\text{call})$ may be decreased to bias the protocol to the higher data rates. This would have the effect of reducing the number of packets at rate $R_{n-1}$ that needed to be received before increasing the rate to $R_n$.

If we reduce the exponents of $P_n(\text{call})$ and $P_{n-2}(\text{call})$ to unity (i.e., set d=1), the algorithm rule would be simple: If a packet were correctly received, move to a higher rate; if not, move to a lower rate. To analyze this "linear" case, we can proceed in a manner similar to the cubic exponent case. Like (1), $$P_{n-1} = P_n \cdot [1 - P_n(\text{call})] + P_{n-2} \cdot P_{n-2}(\text{call}), \quad (11)$$

From (4), $$P_{n-3} = P_{n-2} \cdot [1 - P_{n-2}(\text{call})]. \quad (12)$$

From (5), $$P_{n-2} = \frac{P_{n-2} \cdot [1 - P_{n-1}(\text{call})]}{P_{n-2}(\text{call})}. \quad (13)$$

From (6), $$P_{n-1} = \frac{P_n \cdot [1 - P_n(\text{call})]}{P_{n-1}(\text{call})}. \quad (14)$$

From (7), $$P_n = \frac{P_{n+1}}{P_n(\text{call})}. \quad (15)$$

To determine the value of $P_{n+1}$, we can use Equation (10) without modification, if we redefine $$A_i = [1 - P_i(\text{call})]$$

and $$B_i = P_i(\text{call}).$$

The new values of the $P_i$s are shown in Table 5. Using the call probabilities of Table 1, the $P_i$s and the $P_i \times P_i(\text{call})$ numerical values then can be calculated as was done for Table 3; these are shown in Table 6.

TABLE 5

Summary of the $P_i$s (linear case).

| $P_i$ | Value |
|---|---|
| $\geq P_{n+2}$ | 0 |
| $P_{n+1}$ | $\dfrac{B_n B_{n-1} B_{n-2}}{A_n A_{n-1} A_{n-2} + A_n A_{n-1} + A_n B_{n-2} + B_{n-1} B_{n-2} + B_n B_{n-1} B_{n-2}}$ |
| $P_n$ | $\dfrac{P_{n+1}}{P_n(\text{call})}$ |
| $P_{n-1}$ | $\dfrac{P_n \cdot [1 - P_n(\text{call})]}{P_{n-1}(\text{call})}$ |
| $P_{n-2}$ | $\dfrac{P_{n-1} \cdot [1 - P_{n-1}(\text{call})]}{P_{n-2}(\text{call})}$ |
| $P_{n-3}$ | $P_{n-2} \cdot [1 - P_{n-2}(\text{call})]$ |
| $\leq P_{n-4}$ | 0 |

TABLE 6

Probability $P_i$ that a packet will be sent at a given data rate, and probability $P_i \times P_i(\text{call})$ that a packet will be received at a given data rate (linear case).

| Rate | $P_i(\text{call})$ | $B_i$ | $A_i$ | $P_i$ | $P_i \times P_i(\text{call})$ |
|---|---|---|---|---|---|
| $R_{n-3}$ | 1.000000000000000 | 1 | 0 | 3.01657E-10 | 3.01657E-10 |
| $R_{n-2}$ | 0.999999952462873 | 1 | 4.75E-08 | 0.006345713 | 0.006345712 |
| $R_{n-1}$ | 0.987243370972121 | 0.987243 | 0.012757 | 0.4974443 | 0.491098587 |
| $R_n$ | 0.005177104881681 | 0.005177 | 0.994823 | 0.493654287 | 0.0025557 |
| $R_{n+1}$ | 0.000000000000000 | 0 | 1 | 0.0025557 | 0 |

Finally, the overall data rate for the linear case, $R_{oa}$, can be calculated as was done in Table 4; these are shown in Table 7.

TABLE 7

Calculation of the overall data rate (linear case).

| Rate $R_i$ | $P_i \times P_i(\text{call})$ | Packet Duration $T_i$ | Fraction of Reception Time Using $R_i$ | Overall bits/s |
|---|---|---|---|---|
| 0.125 $R_n$ | 3.01657E−10 | 8 $T_n$ | 2.389E−09 $T_n$ | 2.9863E−10 $R_n$ |
| 0.25 $R_n$ | 0.006345712 | 4 $T_n$ | 0.02512816 $T_n$ | 0.00628204 $R_n$ |
| 0.5 $R_n$ | 0.491098587 | 2 $T_n$ | 0.97234178 $T_n$ | 0.48617089 $R_n$ |
| 1 $R_n$ | 0.0025557 | 1 $T_n$ | 0.00253006 $T_n$ | 0.00253006 $R_n$ |
| 2 $R_n$ | 0 | 0.5 $T_n$ | 0 $T_n$ | 0 $R_n$ |
| | | | Overall Rate $R_{oa}$: | 0.49498299 $R_n$ |

The overall data rate has improved slightly, to 0.495 R. Looking at the $P_i$s, we note that in both Table 3 and Table 6 the algorithm attempts almost the same number of packet transmissions at $R_{n-1}$ and $R_n$ but, because $P_{n-1}(\text{call})$ is 0.987 and $P_n(\text{call})$ is only 0.005, the majority of the transmissions at $R_n$ fail.

Adaptive Data Rate, Blind Transmission

It is noted that if one packet were transmitted at each of the five data rates $R_i$ in Table 3 without requiring acknowledgement (as may occur in a beaconing network when the ranges vary or are unknown), the overall data rate $R_{oa}$ would be:

$$\frac{1}{R_{oa}} = \frac{1}{5}\left[\frac{1}{R_{n-3}} + \frac{1}{R_{n-2}} + \frac{1}{R_{n-1}} + \frac{1}{R_n} + \frac{1}{R_{n+1}}\right]$$

$$\frac{1}{R_{oa}} = \frac{1}{5}\left[\frac{8}{R_n} + \frac{4}{R_n} + \frac{2}{R_n} + \frac{1}{R_n} + \frac{1}{2R_n}\right]$$

$$\frac{1}{R_{oa}} = \frac{31}{10R_n}$$

$$R_{oa} = \frac{10R_n}{31}$$

. . . or just under one-third (0.323) of the base rate $R_n$. The proposed algorithm has an overall data rate superior to this—0.483$R_n$ for d=3 and 0.495$R_n$ for d=1—and guarantees reception due to the receipt of the ACKs.

It is noted that although many of the embodiments discussed herein focus on energy harvesting power sources, it is recognized that other electrical power sources can also be characterized as power-limited and would similarly benefit from scaling transmission data rate according to the available power from the power source. An example is a battery that is near end-of-life (i.e., largely but not completely discharged). Batteries in this state are characterized by lower open-circuit voltage and higher series resistance than fresh, fully charged cells of the same type, and therefore can provide less power to a load. In this case, it would be desirable to lower the data rate in order to maintain communication range while satisfying the battery's available power limitation.

Therefore, in accordance with various embodiments, when the electrical power source is a battery, the available output power of the battery is below a threshold, and a transmitter that transmits the data has a transmission range, a methodology for power-efficient communications may additionally comprise lowering a transmit power of the transmitter and lowering the data rate to a new lower data rate to maintain the transmission range of the transmitter. Lowering the data rate to the new lower data rate may occur prior to lowering the transmit power of the transmitter. Furthermore, prior to lowering the transmit power but after lowering the data rate, the transmission range of the transmitter may be increased.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A power-efficient communication device, comprising:
a power efficient receiver configured in operation to enable a ratio of peak-to-average power consumption of the available output power of an energy harvesting electrical power source to be minimized and to enable energy consumption of the available output power of the energy harvesting electrical power source to be maximized per unit time, the receiver capable of a data reception rate determined, at least in part, by output power available to the receiver from the energy harvesting electrical power source,
wherein the ratio of peak-to-average power consumption of the output power available from the electrical power source by the receiver to receive the data is minimized in order to maximize a portion of the available output power usable to receive the data.

2. The device of claim 1, wherein minimization of the ratio of peak-to-average power consumed by the receiver provides an increased data reception rate.

3. The device of claim 1, wherein minimization of the ratio of peak-to-average power consumed by the receiver increases a reception range of the receiver.

4. The device of claim 3, wherein selective operation of a low noise amplifier (LNA) of the receiver increases the reception range of the receiver.

5. The device of claim 1, wherein minimization of the ratio of peak-to-average power consumed by the receiver occurs by reducing available output power used by the receiver to receive the data.

6. The device of claim 5, wherein the data reception rate of the receiver is increased.

7. The device of claim 5, wherein a reception range of the receiver is increased.

8. The device of claim 7, wherein the reception range of the receiver is increased by selective operation of a low noise amplifier (LNA) of the receiver.

9. A power-efficient communication device, comprising:
a receiver capable of a data reception rate determined, at least in part, by output power available to the receiver from an electrical power source,
wherein a ratio of peak-to-average power consumption of the output power available from the electrical power source by the receiver to receive the data is minimized in order to maximize a portion of the available output power usable to receive the data and wherein minimization of the ratio of peak-to-average power consumed by the receiver occurs by reducing power used by the receiver to receive the data and
wherein the receiver further comprises:
a synthesizer;
a controlled oscillator; and
a sequencer operable to generate a plurality of enable signals that control operation of the synthesizer, the controlled oscillator, and a receiver signal path of the receiver,
wherein the sequencer is operable to selectively control operation of the receiver to prevent simultaneous operation of the synthesizer and the receiver signal path during a receive period of the receiver.

10. The device of claim 9, wherein the sequencer operable to generate a first enable signal that enables the synthesizer, a second enable signal that enables the controlled oscillator, and a third enable signal that enables the receiver signal path of the receiver and wherein during a warm-up period of the receiver the sequencer is operable to activate the first enable signal to enable the synthesizer and the second enable signal to enable the controlled oscillator, wait until the synthesizer is locked, and deactivate the first enable signal and activate the third enable signal to enable the receiver signal path during the receive period of the receiver, and deactivate the second enable signal and the third enable signal following the receive period of the receiver.

11. A power-efficient communication device, comprising:
a receiver capable of a data reception rate determined, at least in part, by output power available to the receiver from an electrical power source,
wherein a ratio of peak-to-average power consumption of the output power available from the electrical power source by the receiver to receive the data is minimized in order to maximize a portion of the available output power usable to receive the data and wherein minimization of the ratio of peak-to-average power consumed by the receiver occurs by reducing power used by the receiver to receive the data and wherein the receiver is operable to reduce the current used by the receiver to receive the data by selective control of the operation of a microcomputer and the receiver to prevent simultaneous operation of the microcomputer and the receiver during a receive period of the receiver.

12. The device of claim 11, wherein the receiver wakes up to receive a data packet while the microcomputer is in a microcomputer sleep mode, place the received data packet in a receive buffer of the receiver, and go into a receiver sleep mode after placement of the received data packet in the receive buffer and wherein the microcomputer wakes to process the received data packet and returns to the microcomputer sleep mode following processing of the received data packet.

13. A power-efficient communication device, comprising:
a power efficient receiver configured in operation to enable a ratio of peak-to-average power consumption of the available output power of an energy harvesting electrical power source to be minimized and to enable energy consumption of the available output power of the energy harvesting electrical power source to be maximized per unit time, the receiver capable of a data reception rate determined, at least in part, by output power available to the receiver from the energy harvesting electrical power source,
wherein the sensitivity of the receiver is determined by the available output power and wherein the sensitivity of the receiver is adjustable by adjustment of the power consumption of the receiver.

14. The device of claim 13, wherein a reception range of the receiver is controlled by selectively turning on a low noise amplifier (LNA) of the receiver to increase the power consumption of the receiver and to increase the reception range of the receiver.

15. A method of power-efficient communications, comprising:
determining an available output power of an energy harvesting electrical power source capable of producing an available output power for an indefinite period of time and having a defined peak power characteristic;
receiving data at a data reception rate determined, at least in part, by the available output power, the receiving data configured to enable a ratio of peak-to-average power consumption of the available output power of the energy harvesting electrical power source to be minimized and to enable energy consumption of the available output power of the energy harvesting electrical power source to be maximized per unit time; and
minimizing the ratio of peak-to-average power consumption of the output power available from the electrical power source in receiving the data in order to maximize a portion of the available output power usable to receive data.

16. The method of claim 15, wherein minimizing the ratio of peak-to-average power provides for increasing one or more of the data reception rate and reception range.

17. The method of claim 16, wherein minimizing the ratio of peak-to-average power provides for increasing a reception range of a receiver that receives the data and further comprising:
reducing power consumption of the receiver.

18. The method of claim 17, further comprising controlling a reception range of the receiver by selectively turning on a low noise amplifier (LNA) of the receiver to increase the reception range of the receiver.

19. The method of claim 15, wherein minimizing the ratio of peak-to-average power further comprises reducing power used by a receiver to receive the data.

20. The method of claim 19, further comprising increasing the data reception rate of the receiver.

21. The method of claim 19, further comprising increasing a reception range of the receiver.

22. The method of claim 21, further comprising:
selectively turning on a low noise amplifier (LNA) of the receiver to increase the reception range of the receiver.

23. The method of claim 19, wherein reducing power used by the receiver to receive the data further comprises:
selectively controlling operation of the receiver to minimize the ratio of peak-to-average power used by a synthesizer and a transmit signal path of the receiver during a receive period of the receiver.

24. The method of claim 19, wherein reducing power used by the receiver to receive the data further comprises:
selectively controlling operation of a microcomputer and the receiver to minimize the ratio of peak-to-average power used by the microcomputer and the receiver.

25. A method of power-efficient communications, comprising:
determining an available output power of an electrical power source;
receiving data at a data reception rate determined, at least in part, by the available output power;
minimizing a ratio of peak-to-average power consumption of the output power available from the electrical power source in receiving the data in order to maximize a portion of the available output power usable to receive data, wherein minimizing the ratio of peak-to-average power comprises reducing power used by a receiver to receive the data by selectively controlling operation of a microcomputer and the receiver to minimize the ratio of peak-to-average power used by the microcomputer and the receiver;
the receiver waking up from a receiver sleep mode and receiving a data packet while the microcomputer is in a microcomputer sleep mode;
the receiver placing the received data packet in a receive buffer of the receiver;
the receiver going into a receiver sleep mode;
the microcomputer waking up and processing the received data packet; and
the microcomputer going into the microcomputer sleep mode.

26. A method of power-efficient communications, comprising:
determining an available output power of an energy harvesting electrical power source capable of producing an available output power for an indefinite period of time and having a defined peak power characteristic;
receiving data at a data reception rate determined, at least in part, by the available output power, the receiving data configured to enable a ratio of peak-to-average power consumption of the available output power of the energy harvesting electrical power source to be minimized and to enable energy consumption of the available output power of the energy harvesting electrical power source to be maximized per unit time, further comprising:
determining a data reception rate of data transmitted by a first network device and received by a second network device; and
estimating a range between said first and second network devices from the data reception rate.

27. The method of claim 26, wherein the range is further determined from an estimated transmit power of the first network device.

28. The method of claim 26, wherein an RSSI value is not needed to estimate the range.

29. A method of power-efficient communications, comprising:
- determining an available output power of an energy harvesting electrical power source capable of producing an available output power for an indefinite period of time and having a defined peak power characteristic; and
- adjusting the sensitivity of a power-efficient receiver in accordance with the determined available output power, the power efficient receiver configured in operation to enable a ratio of peak-to-average power consumption of the available output power of an energy harvesting electrical power source to be minimized and to enable energy consumption of the available output power of the energy harvesting electrical power source to be maximized per unit time.

30. The method of claim 29, wherein adjusting the sensitivity of the receiver further comprises:
- adjusting the power consumption of the receiver.

31. The method of claim 30, further comprising:
- controlling a reception range of the receiver by selectively turning on a low noise amplifier (LNA) of the receiver to increase the power consumption of the receiver and to increase the reception range of the receiver.

* * * * *